US011935372B2

(12) United States Patent
Sugahara et al.

(10) Patent No.: US 11,935,372 B2
(45) Date of Patent: Mar. 19, 2024

(54) DRAWER TRAY, COIN HANDLING APPARATUS AND COIN HANDLING SYSTEM

(71) Applicant: Glory Ltd., Hyogo (JP)

(72) Inventors: Kazuma Sugahara, Hyogo (JP); Fumio Kibihara, Hyogo (JP)

(73) Assignee: GLORY LTD., Himeji (JP)

( * ) Notice: Subject to any disclaimer, the term of this patent is extended or adjusted under 35 U.S.C. 154(b) by 14 days.

(21) Appl. No.: 17/496,821

(22) Filed: Oct. 8, 2021

(65) Prior Publication Data

US 2022/0114867 A1 Apr. 14, 2022

(30) Foreign Application Priority Data

Oct. 12, 2020 (JP) ................................ 2020-171860

(51) Int. Cl.
*G07G 1/00* (2006.01)
*G07D 9/02* (2006.01)
*G07D 13/00* (2006.01)

(52) U.S. Cl.
CPC ............. *G07G 1/0027* (2013.01); *G07D 9/02* (2013.01); *G07D 13/00* (2013.01)

(58) Field of Classification Search
CPC ......... G07G 1/0027; G07D 9/02; G07D 13/00
See application file for complete search history.

(56) References Cited

U.S. PATENT DOCUMENTS 3,087,771 A * 4/1963 Pari ........................ A47B 88/57 312/332
3,604,772 A * 9/1971 Smith ..................... A47F 7/288 312/45
5,723,850 A * 3/1998 Lambert .............. G07G 1/0027 235/22
5,768,965 A * 6/1998 Gonzalez ............... A47B 88/90 235/7 R
9,842,475 B2 * 12/2017 Chap ....................... F21V 33/00
2009/0014544 A1 * 1/2009 Cox ..................... G07G 1/0027 235/7 A
2010/0017017 A1 * 1/2010 Adams .................. G06Q 40/12 194/215
2012/0068588 A1 * 3/2012 Specht ................ G07G 1/0027 312/293.1

(Continued)

FOREIGN PATENT DOCUMENTS

EP 1256915 A1 11/2002
EP 2 690 604 A1 1/2014

(Continued)

OTHER PUBLICATIONS

Extended European Search Report dated Mar. 15, 2022 in European Patent Application No. 21201571.3, 9 pages.

*Primary Examiner* — Thien M Le
*Assistant Examiner* — Asifa Habib
(74) *Attorney, Agent, or Firm* — XSENSUS LLP

(57) ABSTRACT

Provided is a drawer tray provided in a coin handling apparatus storing a coin in a compartment of a drawer. The drawer tray includes: a placement unit where the drawer is placed; and a regulation unit that regulates a placement position of the drawer in the placement unit to a position. The regulation unit regulates the placement position of the drawer to a plurality of positions different from each other by disposition of the regulation unit.

13 Claims, 12 Drawing Sheets

(56) References Cited

U.S. PATENT DOCUMENTS

2012/0273698 A1* 11/2012 Gudgell ................. G07D 7/128
250/492.1
2013/0045133 A1* 2/2013 Maguire ................... A61L 2/24
422/1
2019/0026970 A1* 1/2019 Doi .......................... G07D 1/00

FOREIGN PATENT DOCUMENTS

JP 5732543 B2 6/2015
JP 2018-101279 A 6/2018

* cited by examiner

DRAWER TRAY, COIN HANDLING APPARATUS AND COIN HANDLING SYSTEM

CROSS-REFERENCE TO RELATED APPLICATION

The present application is based on Japanese application number 2020-171860, filed Oct. 12, 2020, the entire contents of which are incorporated herein by reference.

TECHNICAL FIELD

The present disclosure relates to a drawer tray, a coin handling apparatus, and a coin handling system.

BACKGROUND

In the related art, as a cash management system installed in a store, there is known a system comprising: a first cash handling apparatus that performs settlement processing by depositing and dispensing cash; and a second cash handling apparatus that dispenses cash that is loaded to the first cash handling apparatus, and that deposits cash collected from the first cash handling apparatus. The first cash handling apparatus is disposed in a register counter in a store, and the second cash handling apparatus is disposed in a back office in the store. In such a cash management system, a drawer may be used for cash transport between the first cash handling apparatus and the second cash handling apparatus.

For example, large-scale stores may introduce various types of first cash handling apparatuses in accordance with the floors and sales floors. In this case, there may also be various types of drawers used in the first cash handling apparatuses. Further, in a case where malls (large-scale shopping centers) or the like provide various tenant stores with change funds in the operation, especially types of drawers are also diversified and it is necessary to address a plurality of types of drawers. As an apparatus for preparing change for such a plurality of types of drawers, an apparatus as described in Patent Literature (hereinafter, referred to as "PTL") 1 is known, for example.

The apparatus described in PTL 1 is configured to make a plurality of chutes in accordance with types of tills (drawers) ready and to be capable of preparing change in the respective tills by attaching chutes corresponding to the tills to the apparatus.

CITATION LIST

Patent Literature

PTL 1

European Patent No. 1256915

SUMMARY

A drawer tray of the present disclosure is provided in a coin handling apparatus storing a coin in a compartment of a drawer. The drawer tray comprises: a placement unit where the drawer is placed; and a regulation unit that regulates a placement position of the drawer in the placement unit. The regulation unit regulates the placement position of the drawer to a plurality of positions different from each other by disposition of the regulation unit.

A coin handling apparatus of the present disclosure comprises: the drawer tray described above; and a transport unit that transports the coin to the drawer, the placement position of which is regulated by the regulation unit of the drawer tray.

A coin handling system of the present disclosure comprises: a plurality of the drawer trays described above; and a transport unit that transports the coin to the drawer, the placement position of which is regulated by the regulation unit of any one drawer tray of the plurality of drawer trays. The plurality of drawer trays is configured such that each of the plurality of drawer trays is attached to the coin handling apparatus. The regulation unit of each of the plurality of drawer trays is disposed in the placement unit so as to regulate a position of the drawer to a plurality of positions different from each other by disposition of the regulation unit.

DETAILED DESCRIPTION

Since the apparatus as in PTL 1 is capable of storing a coin in only a drawer of one type with a chute of one type, it is necessary to replace the chute for each drawer of a different type, and complicated work is needed to cope with a variety of drawers.

An object of the present disclosure is to provide a drawer tray, a coin handling apparatus, and a coin handling system that are capable of storing coins in drawers of different types with easy work.

According to the drawer tray, the coin handling apparatus, and the coin handling system of the present disclosure, it is possible to store coins in drawers of different types with easy work.

[Embodiment]

Hereinafter, an embodiment of the present disclosure will be described with reference to the accompanying drawings.

<Configuration of Money Handling System>

Figure 1:
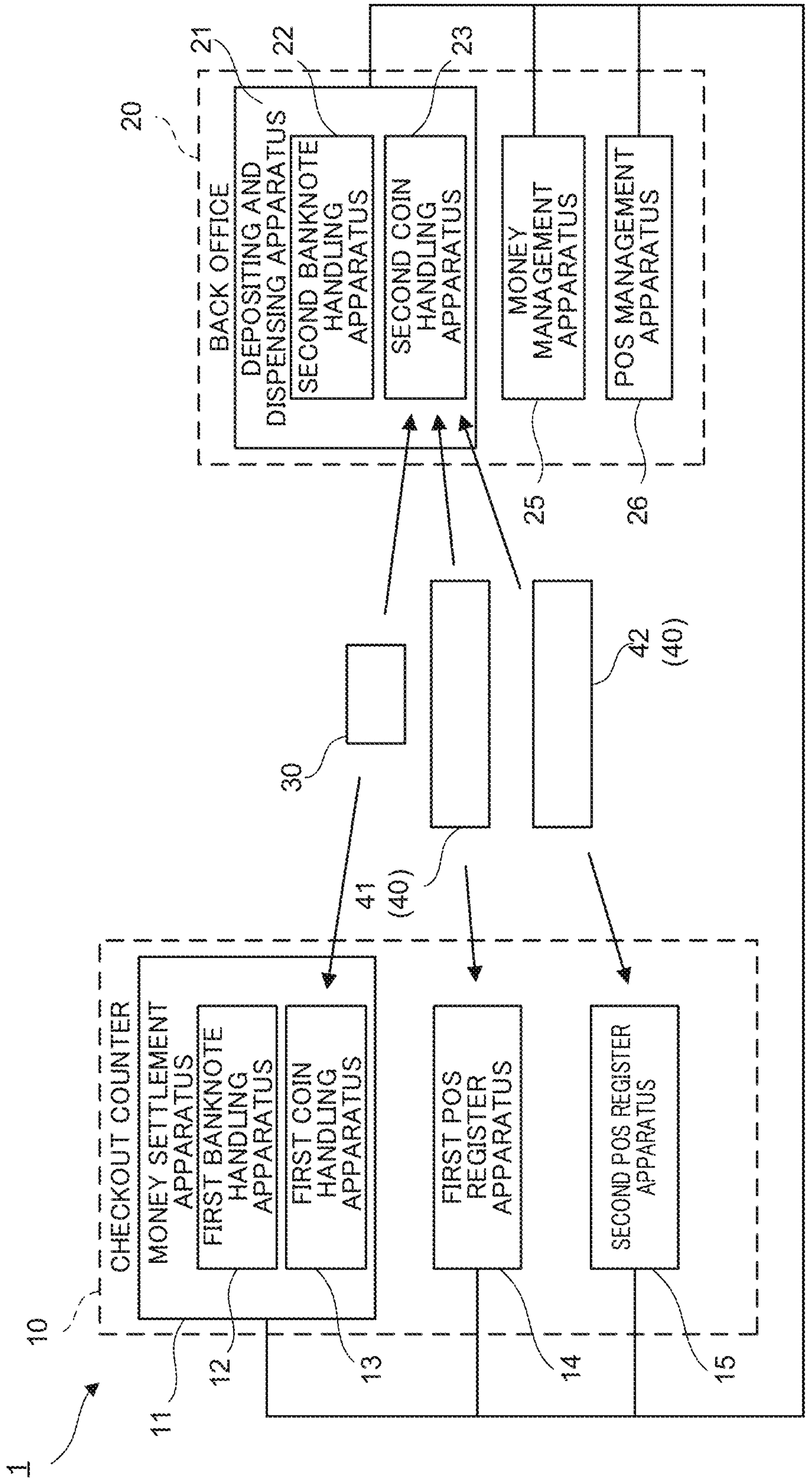
FIG. 1 is a block diagram illustrating a schematic configuration of a money handling system according to an embodiment of the present disclosure.
Figure 2:
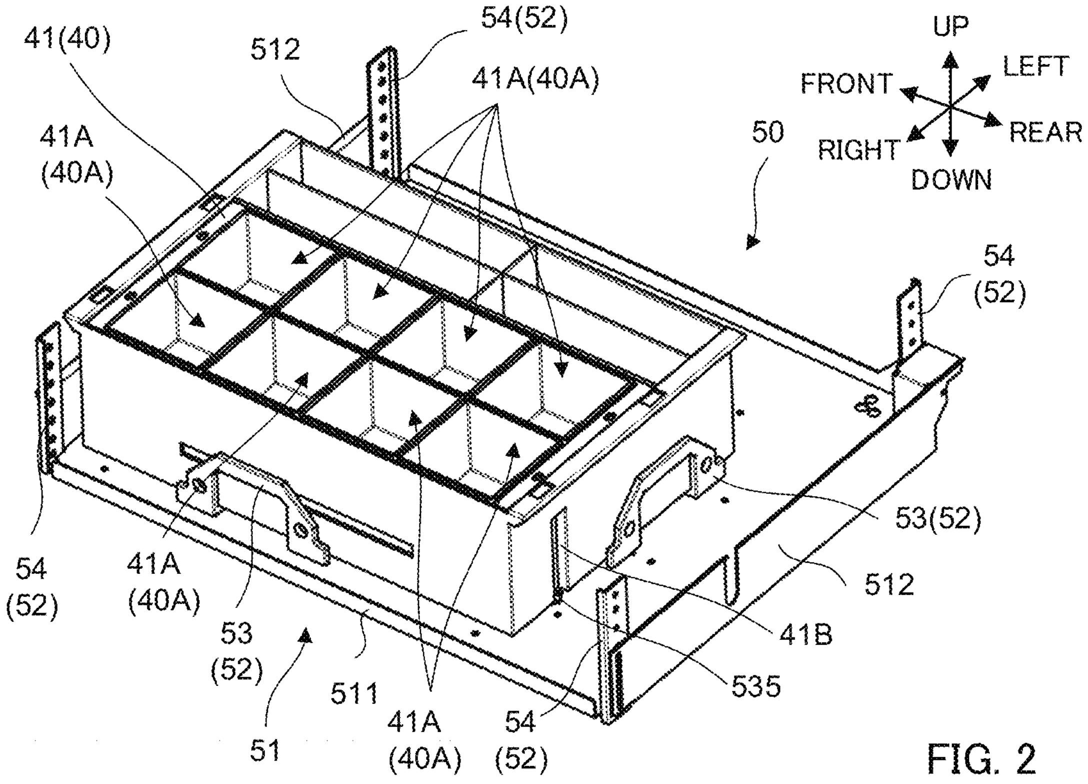
FIG. 2 is a perspective view illustrating a state in which a first drawer is placed in a correct orientation above a drawer tray according to the embodiment of the present disclosure.
Figure 3:
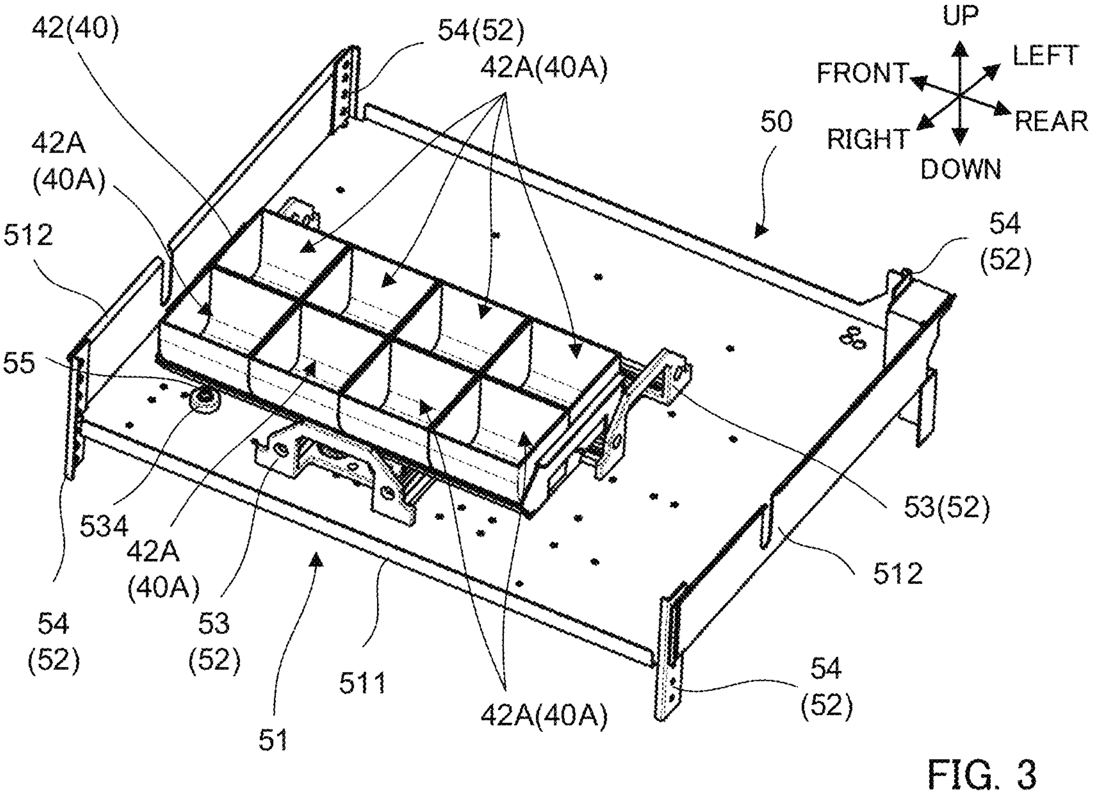
FIG. 3 is a perspective view illustrating a state in which a second drawer is placed in a correct orientation above the drawer tray according to the embodiment of the present disclosure.

First, a configuration of a money handling system will be described. In the present embodiment, a front office of a store refers to an area where a money settlement apparatus whereby a customer settles a commercial product is installed. Aback office of a store refers to an area where an apparatus that manages banknotes and coins that are handled by a money settlement apparatus is installed. Note that, in the present embodiment, banknotes and coins may be referred to collectively as money. In the present embodiment, types of drawers refer to groups distinguished by the shapes of the drawers. Drawers of types different from each other differ from each other in at least one of size, shape and/or height of the drawer, and/or size, shape and/or location of a compartment of the drawer. FIG. 1 is a block diagram illustrating a schematic configuration of a money handling system according to the embodiment of the present disclosure. FIG. 2 is a perspective view illustrating a state in which a first drawer is placed in a correct orientation above a drawer tray. FIG. 3 is a perspective view illustrating a state in which a second drawer is placed in a correct orientation above the drawer tray.

A money handling system 1 illustrated in FIG. 1 is a system for distribution and is installed in a store. The money handling system 1 comprises a money settlement apparatus 11, a first POS register apparatus 14, a second POS register apparatus 15, a depositing and dispensing apparatus 21, a money management apparatus 25, a POS management apparatus 26, and coin transport cassettes 30. Note that, the money handling system 1 may comprise not less than two money settlement apparatuses 11, may comprise only one of the two POS register apparatuses, or may comprise not less than three POS register apparatuses.

The money settlement apparatus 11 is installed in a checkout counter 10 that is an example of a front office of a store. The money settlement apparatus 11 is operated by a clerk or a customer himself/herself, and is used in settlement processing between a clerk and a customer. The money settlement apparatus 11 deposits payment paid by a customer or dispenses change that is paid to a customer. The money settlement apparatus 11 is communicably connected to a POS register (not illustrated) that is operated by a clerk or to a self-checkout register (not illustrated) that is operated by a customer. Note that, the money settlement apparatus 11 may be integrally formed with the POS register or the self-checkout register.

Figure 6:
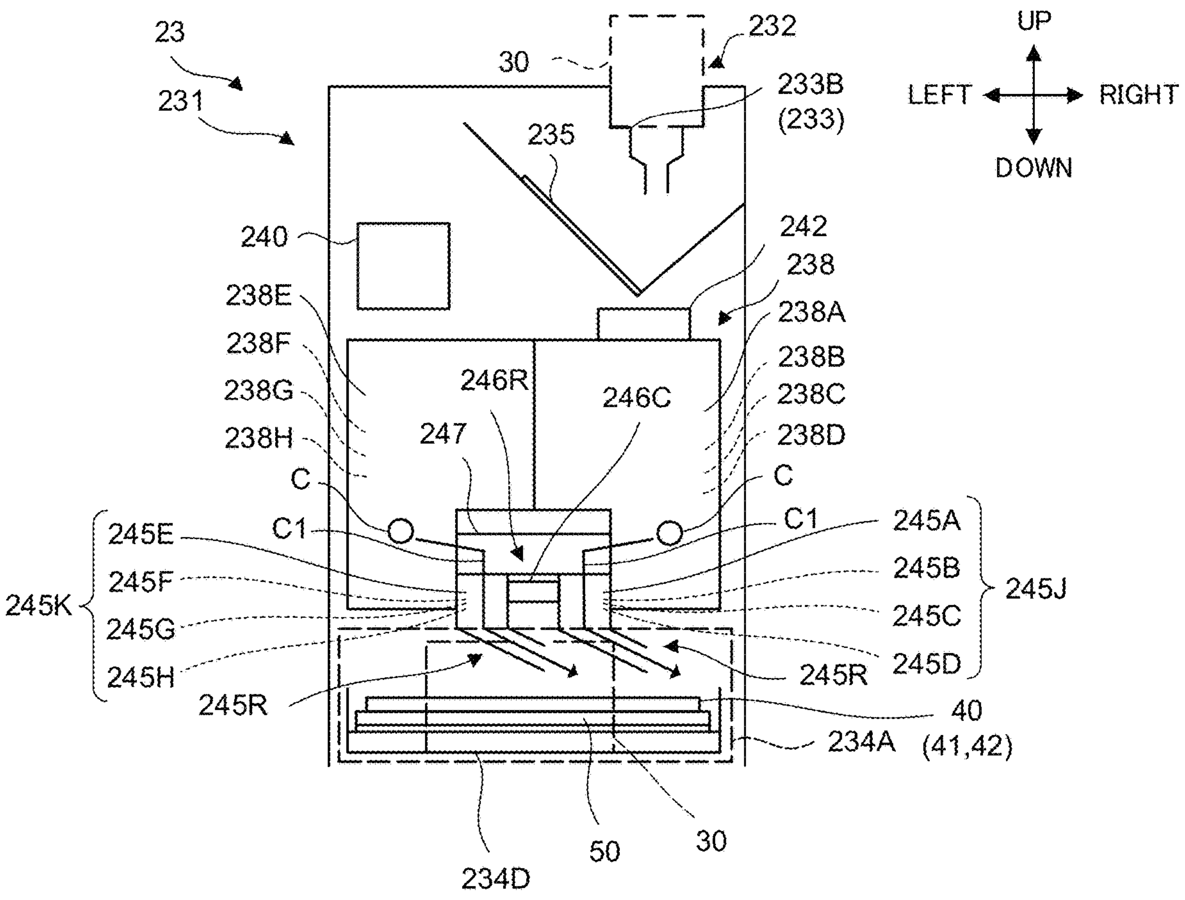
FIG. 6 is a schematic diagram illustrating the internal configuration of the second coin handling apparatus according to the embodiment of the present disclosure when viewed from a front side, illustrating a state when the drawer is replenished with a coin.

The money settlement apparatus 11 comprises: a first banknote handling apparatus 12 that handles a banknote; and a first coin handling apparatus 13 that handles a coin C (see FIG. 6). Note that, the money settlement apparatus 11 may be an apparatus that performs only depositing and dispensing processing of the coin C.

The first POS register apparatus 14 and the second POS register apparatus 15 are installed in the checkout counter 10. A clerk manually deposits or dispenses money to or from a first drawer 41 of the first POS register apparatus 14 and a second drawer 42 of the second POS register apparatus 15, thereby settlement processing of the first POS register apparatus 14 and the second POS register apparatus 15 is performed. Note that, in a case where it is not necessary to describe the first drawer 41 and the second drawer 42 while making a distinction therebetween, at least one of the first drawer 41 and the second drawer 42 may be referred to as "drawer 40".

The depositing and dispensing apparatus 21, the money management apparatus 25, and the POS management apparatus 26 are installed in a back office 20 of the store. The depositing and dispensing apparatus 21 is communicably connected to each of the money settlement apparatus 11, the first POS register apparatus 14 and the second POS register apparatus 15. The depositing and dispensing apparatus 21 dispenses change funds for being loaded to the money settlement apparatus 11, the first POS register apparatus 14 and the second POS register apparatus 15, or deposits proceeds from sales collected from the money settlement apparatus 11, the first POS register apparatus 14 and the second POS register apparatus 15. The depositing and dispensing apparatus 21 comprises: a second banknote handling apparatus 22 that handles a banknote; and a second coin handling apparatus 23 that handles the coin C. Details of the second coin handling apparatus 23 will be described later.

The money management apparatus 25 is communicably connected to each of the money settlement apparatus 11, the first POS register apparatus 14, the second POS register apparatus 15, and the depositing and dispensing apparatus 21 via a local area network (LAN) or the like. The money management apparatus 25 manages money stored in each of the money settlement apparatus 11, the first POS register apparatus 14, the second POS register apparatus 15, and the depositing and dispensing apparatus 21. The POS management apparatus 26 manages a flow of a commercial product.

The coin transport cassette 30 is attached to and detached from the first coin handling apparatus 13 of the money settlement apparatus 11, and is attached to and detached from the second coin handling apparatus 23 of the depositing and dispensing apparatus 21. A clerk uses the coin transport cassette 30 to transport the coin C between the first coin handling apparatus 13 and the second coin handling apparatus 23.

The first drawer 41 is attached to and detached from the first POS register apparatus 14, and is attached to and detached from the second coin handling apparatus 23 of the depositing and dispensing apparatus 21. As illustrated in FIG. 2, the first drawer 41 comprises a plurality of compartments 41A. The plurality of compartments 41A respectively stores the coins C of a plurality of denominations different from each other. The second drawer 42 is attached to and detached from the second POS register apparatus 15, and is attached to and detached from the second coin handling apparatus 23 of the depositing and dispensing apparatus 21.

As illustrated in FIG. 3, the second drawer 42 is formed in a shape different from the shape of the first drawer 41. The height of the second drawer 42 is lower than the height of the first drawer 41. The second drawer 42 comprises a plurality of compartments 42A. The plurality of compartments 42A respectively stores the coins C of a plurality of denominations different from each other. Each of the compartments 42A of the second drawer 42 comprises an opening whose size is substantially the same as a size of an opening of each of the compartments 41A of the first drawer 41. The arrangement of the respective compartments 42A of the second drawer 42 is approximately the same as the arrangement of the respective compartments 41A of the first drawer 41.

Note that, in a case where it is not necessary to describe the compartment 41A and the compartment 42A while making a distinction therebetween, at least one of the compartment 41A and the compartment 42A may be referred to as "compartment 40A". Denominations that are stored in the respective compartments 41A and the respective compartments 42A may be determined in accordance with operations of the first drawer 41 and the second drawer 42. For example, the coins C of one denomination may be stored in two of the compartments 41A. For example, when a change fund is loaded or when proceeds from sales are collected, a clerk uses the first drawer 41 and/or the second drawer 42 to transport the coin C between the first POS register apparatus 14 and the second coin handling apparatus 23 and/or between the second POS register apparatus 15 and the second coin handling apparatus 23.

<Configuration of Second Coin Handling Apparatus of Depositing and Dispensing Apparatus>

Figure 4:
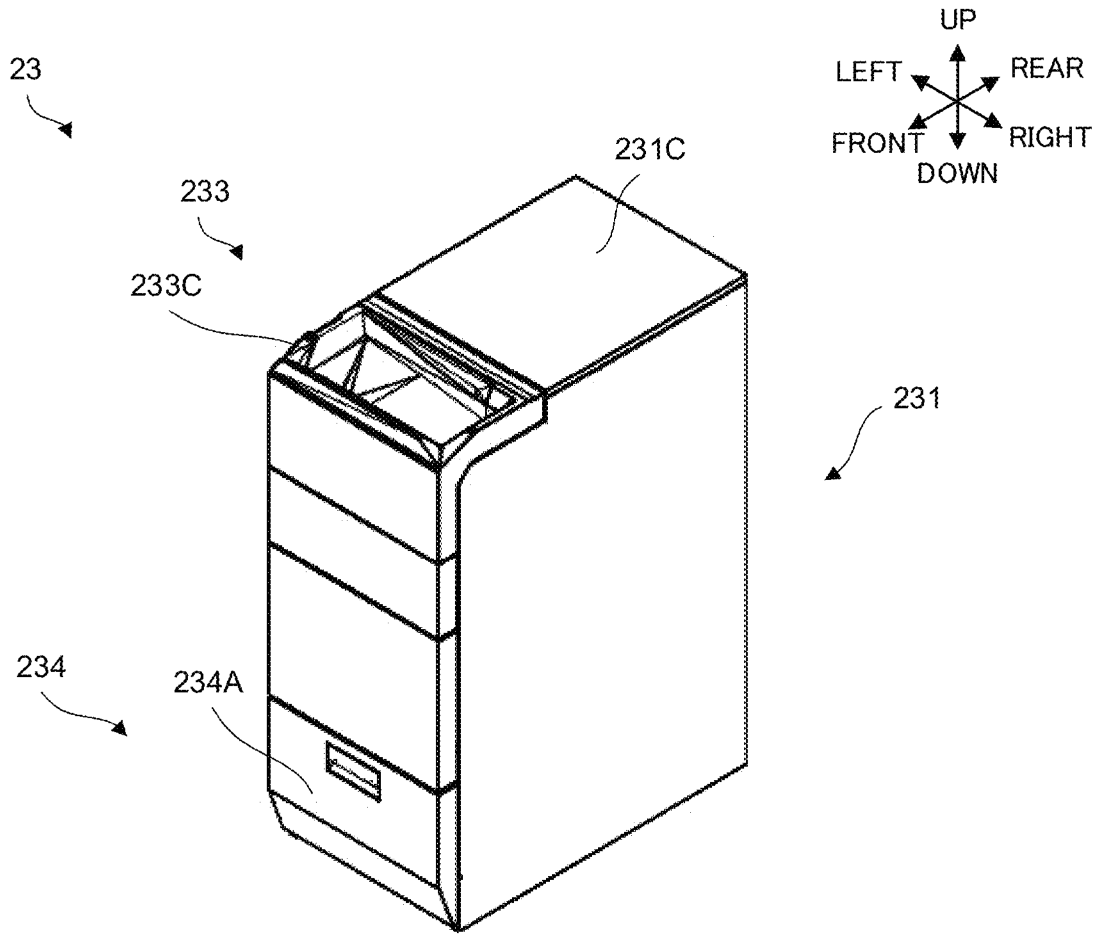
FIG. 4 is a perspective view of an external appearance of a second coin handling apparatus according to the embodiment of the present disclosure.
Figure 5:
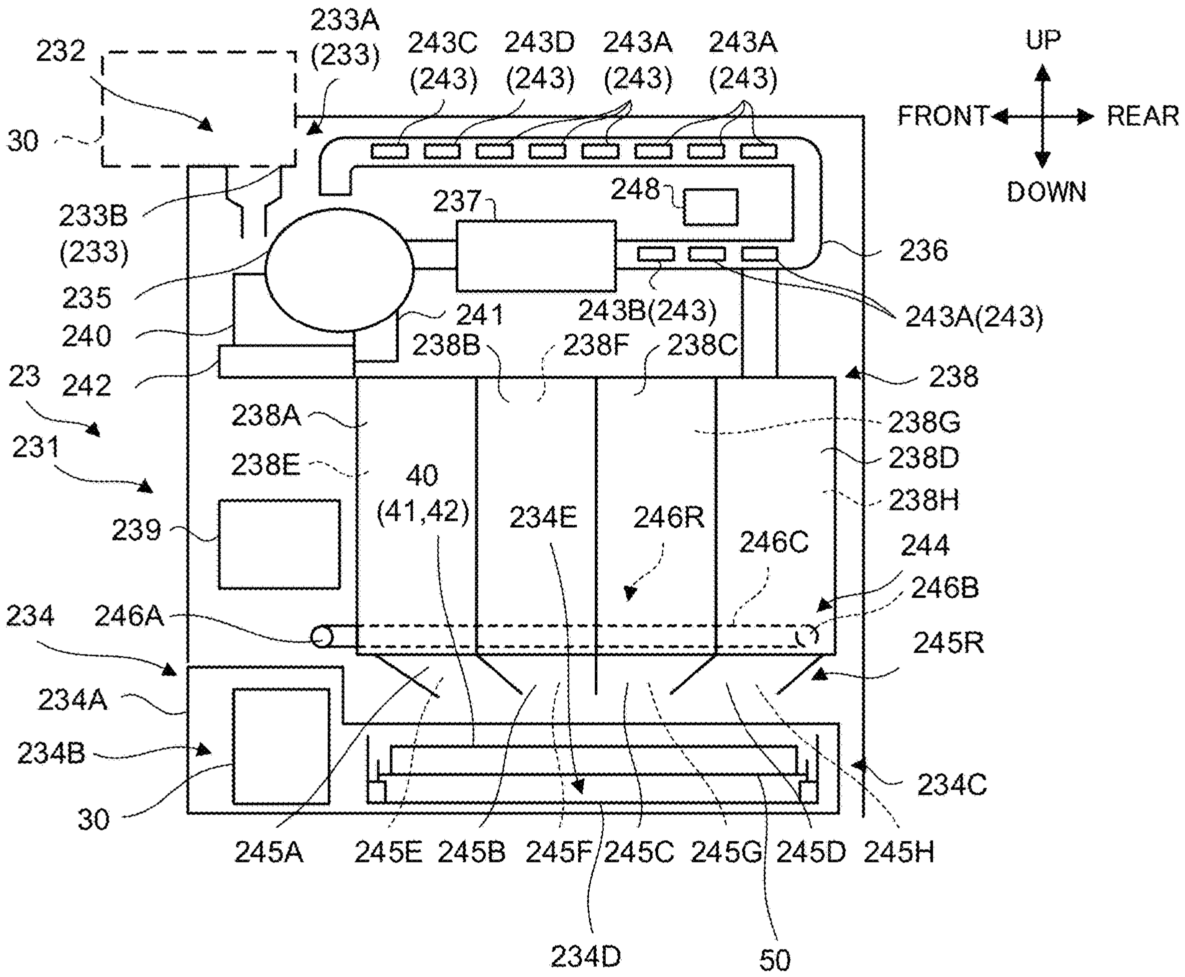
FIG. 5 is a schematic diagram illustrating an internal configuration of the second coin handling apparatus according to the embodiment of the present disclosure when viewed from a right side, illustrating a state when a drawer is replenished with a coin.
Figure 7A:
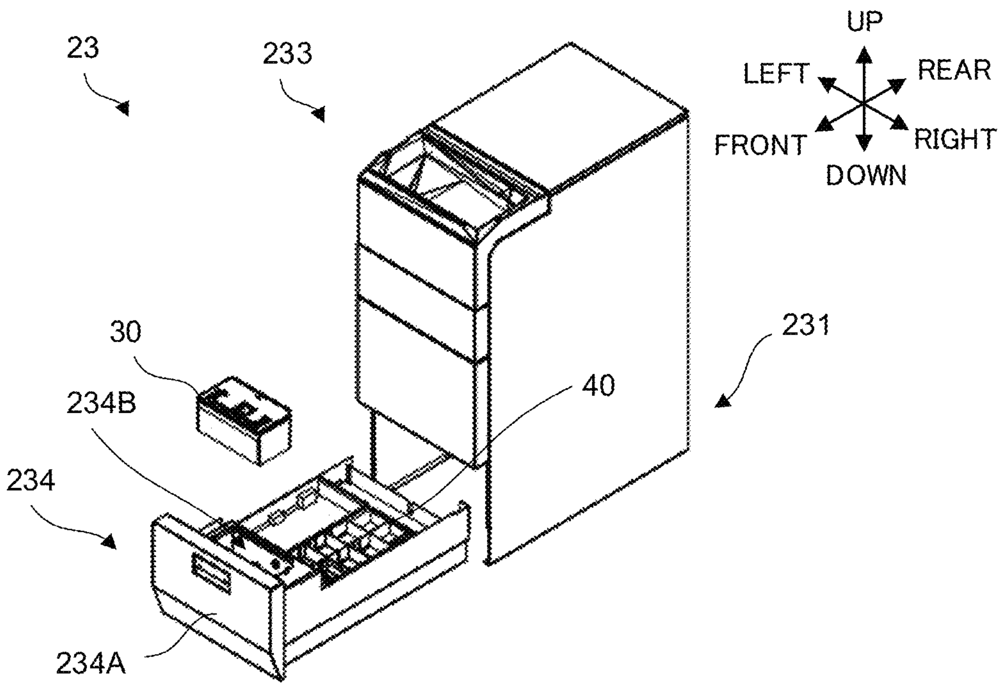
FIG. 7A is a perspective view illustrating how a coin transport cassette is attached to the second coin handling apparatus according to the embodiment of the present disclosure.
Figure 7B:
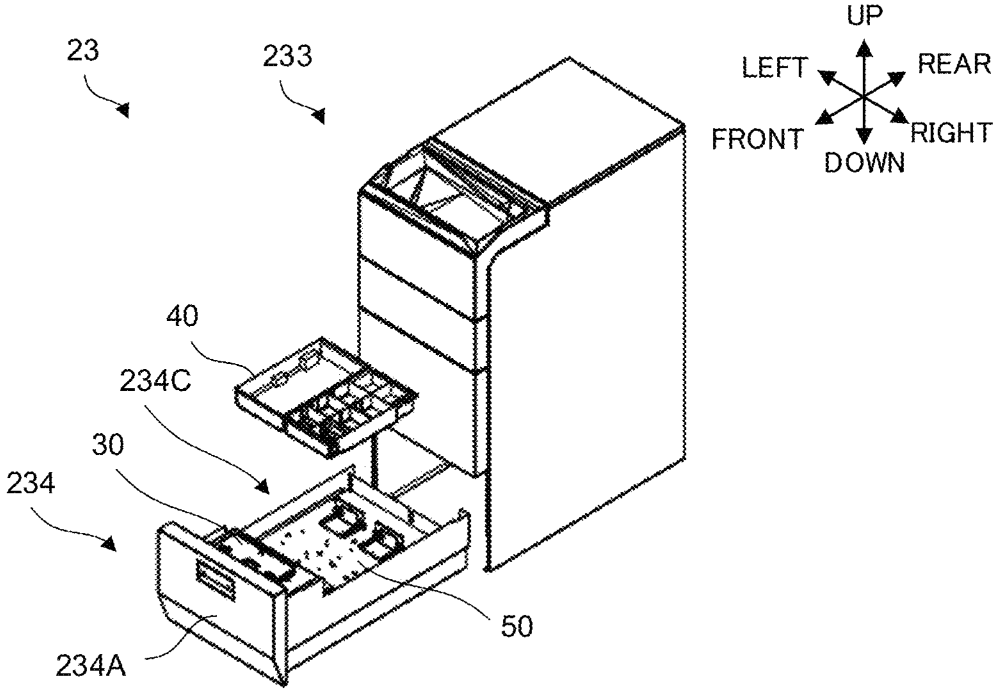
FIG. 7B is a perspective view illustrating how the drawer is attached to the second coin handling apparatus according to the embodiment of the present disclosure.

Next, a configuration of the second coin handling apparatus 23 will be described. FIG. 4 is a perspective view of an external appearance of the second coin handling apparatus. FIG. 5 is a schematic diagram illustrating an internal configuration of the second coin handling apparatus when viewed from a right side, illustrating a state when the drawer is replenished with a coin. FIG. 6 is a schematic diagram illustrating the internal configuration of the second coin handling apparatus when viewed from a front side, illustrating a state when the drawer is replenished with a coin. FIG. 7A is a perspective view illustrating how the coin transport cassette is attached to the second coin handling apparatus. FIG. 7B is a perspective view illustrating how the drawer is attached to the second coin handling apparatus.

First, a configuration of the second coin handling apparatus 23 visible from the outside will be described. As illustrated in FIG. 4, FIG. 5 and FIG. 6, the second coin handling apparatus 23 comprises a housing 231, a second cassette attachment unit 232, a depositing unit 233, and a dispensing unit 234.

As illustrated in FIG. 5 and FIG. 6, the second cassette attachment unit 232 is formed of a recessed portion provided in an upper and front portion of the housing 231. As indicated by two-dot chain lines in FIG. 5 and FIG, 6, the second cassette attachment unit 232 is configured to allow the coin transport cassette 30 to be attached to the second cassette attachment unit 232.

The depositing unit 233 is provided in the upper and front portion of the housing 231, and is configured such that the coin C can be deposited into the second coin handling apparatus 23. The depositing unit 233 comprises a first reception port 233A, a second reception port 233B, and a cover 233C.

The first reception port 233A is configured to be capable of receiving the coin C discharged from the coin transport cassette 30 attached to the second cassette attachment unit 232.

The second reception port 233B is an opening provided in a bottom surface portion that forms the second cassette attachment unit 232. The second reception port 233B is configured to be covered by the coin transport cassette 30 when the coin transport cassette 30 is attached to the second cassette attachment unit 232.

The cover 233C turns with respect to the housing 231, and is switched between a closed state in which the cover 233C covers the first reception port 233A and the second cassette attachment unit 232 and an open state in which the cover 233C does not cover the first reception port 233A and the second cassette attachment unit 232. The cover 233C is provided with an opening (not illustrated) for manually depositing the coin C into the second coin handling apparatus 23 through the reception port 233B when the cover 233C is in the closed state. When the cover 233C is in the open state, the second cassette attachment unit 232 is exposed and the coin transport cassette 30 can be attached thereto.

As illustrated in FIG. 7A and FIG. 7B, the dispensing unit 234 comprises a drawer portion 234A that can be drawn out from a lower portion of the housing 231 onto a side of a clerk. A first cassette attachment unit 234B is provided in a front-side portion in the drawer portion 234A. As illustrated in FIG. 7B, the coin transport cassette 30 is attached to the first cassette attachment unit 234B. As illustrated in FIG. 7B, a drawer attachment unit 234C is provided rearward from the first cassette attachment unit 234B in the drawer portion 234A. As illustrated in FIG. 7A, the drawer 40 is attached to the drawer attachment unit 234C via a drawer tray 50. Note that, a detailed configuration of the drawer tray 50 will be described later.

Next, an internal configuration of the second coin handling apparatus 23 will be described. As illustrated in FIG. 5 and FIG. 6, the second coin handling apparatus 23 further comprises a feeding unit 235, an upper-side transport unit 236, a recognition unit 237, a storage unit 238, a reject unit 239, an overflow storage unit 240, a forged coin storage unit 241, a return unit 242, a plurality of upper-side chutes 243, a lower-side transport unit 244, a switching unit 247, and a control unit 248.

The drawer attachment unit 234C of the dispensing unit 234 is provided with a collection housing 234D. The collection housing 234D comprises an upper surface that is opened. The drawer tray 50 where drawer 40 is placed is attached inside the collection housing 234D. In a state in which the drawer 40 and the drawer tray 50 are not attached inside the collection housing 234D, the inside of the collection housing 234D functions as a collection unit 234E that collects the coin C stored in the storage unit 238.

The feeding unit 235 is configured to be capable of receiving the coin C deposited from the coin transport cassette 30 through the first reception port 233A and the coin C deposited through the second reception port 233B, feeding out the coin C one by one, and causing the coin C to fall into the return unit 242.

The upper-side transport unit 236 transports the coin C fed out of the feeding unit 235.

The recognition unit 237 is provided in the upper-side transport unit 236, recognizes denomination, authenticity, fitness, and/or the like of the coin C deposited through the depositing unit 233, and counts the coins C.

The storage unit 238 comprises storage boxes 238A, 238B, 238C, 238D, 238E, 238F, 238G, and 238H (which may be referred to hereinafter as "storage boxes 238A to 238H"). The storage boxes 238A to 238H are configured to be capable of storing the coin C and feeding out the coin C that has been stored. The storage boxes 238A to 238D are provided so as to be side by side in the front-rear direction on the right side in the housing 231. The storage boxes 238E to 238H are provided so as to be side by side in the front-rear direction on the left side in the housing 231. In FIG. 5, the storage boxes 238E to 238H are hidden behind the storage boxes 238A to 238D. In FIG. 6, the storage boxes 238B to 238D and 238F to 238H are hidden behind the storage boxes 238A and 238E. Denominations that are stored in the storage boxes 238A to 238H, respectively, are set in advance.

The reject unit 239 stores, as a rejected coin, the coin C recognized not as a coin to be handled or as unrecognizable by the recognition unit 237. The reject unit 239 is drawn out from a side of a front surface of the housing 231 by opening a cover (not illustrated) of the housing 231.

The overflow storage unit 240 stores, as an overflow coin, the coin C that cannot be held in a case where the holding number of the coin C in the storage boxes 238A to 238H exceeds a predetermined holding number that has been set. The overflow storage unit 240 is drawn out from the side of the front surface of the housing 231.

The forged coin storage unit 241 stores the coin C recognized as a forged coin by the recognition unit 237. The forged coin storage unit 241 is drawn out from the side of the front surface of the housing 231.

The return unit 242 stores the coin C that has fallen from the feeding unit 235. The return unit 242 is drawn out from the side of the front surface of the housing 231.

The upper-side chutes 243 are provided downstream of the recognition unit 237 in the upper-side transport unit 236 in a transport direction of the coin C. The upper-side chutes 243 are provided side by side in a row in the transport direction of the coin C. Of the plurality of upper-side chutes 243, eight upper-side chutes 243A are configured to be capable of guiding the coin C to any one of the storage boxes 238A to 238H. Another chute 243B is configured to be capable of guiding a rejected coin to the reject unit 239. Yet another upper-side chute 243C is configured to be capable of guiding an overflow coin to the overflow storage unit 240. One upper-side chute 243D that is the remaining upper-side chute 243 is configured to be capable of guiding a forged coin to the forged coin storage unit 241. The upper-side chutes 243 are normally closed by gates (not illustrated), and guide the coin C to each portion described above by opening the gates.

The lower-side transport unit 244 transports the coin C fed out of the storage unit 238 to the drawer 40 attached to the drawer attachment unit 234C or the coin transport cassette 30 attached to the first cassette attachment unit 234B. The lower-side transport unit 244 comprises a first route forming portion 245 and a second route forming portion 246.

The first route forming portion 245 forms a first route 245R that guides the coin C fed out of the storage unit 238 to the drawer 40 attached to the drawer attachment unit 234C. The first route forming portion 245 comprises drawer chutes 245A, 245B, 245C, 245D, 245E, 245F, 245G, and 245H (which may be referred to hereinafter as "drawer chutes 245A to 245H"). The drawer chutes 245A to 245H are provided one by one downward from the storage boxes 238A to 238H, respectively. In FIG. 5, the drawer chutes 245E to 245H are hidden behind the drawer chutes 245A to 245D. In FIG. 6, the drawer chutes 245B to 245D and 245F to 245H are hidden behind the drawer chutes 245A and 245E. The drawer chutes 245A to 245D form a first chute unit 245J and are integrally detached from the storage boxes 238A to 238D. The drawer chutes 245E to 245H form a second chute unit 245K and are integrally detached from the storage boxes 238E to 238H. Note that, one chute unit may be formed of the drawer chutes 245A to 245H. The drawer chutes 245A to 245H guide the coin C stored in the storage boxes 238A to 238H to the drawer 40 attached to the drawer attachment unit 234C.

Note that, a chute unit of a different type from the first chute unit 245J and the second chute unit 245K is attachable to the storage boxes 238A to 238H. In a case where the chute unit of a different type is attached to the storage boxes 238A to 238H, at least one of a height of lower ends (outlets for the coin C (hereinafter, referred to as "coin C-outlets")) of drawer chutes and a position thereof in a horizontal direction may differ from that/those in a case where the first chute unit 245J and the second chute unit 245K are attached.

The second route forming portion 246 forms a second route 246R that guides the coin C fed out of the storage unit 238 to the coin transport cassette 30 attached to the first cassette attachment unit 234B. The second route forming portion 246 is provided between a row formed of the drawer chutes 245A to 245D in the front-rear direction and a row formed of the drawer chutes 245E to 245H in the front-rear direction. The second route forming portion 246 comprises a transport belt 246C wound around a driving pulley 246A and a driven pulley 246B. The transport belt 246C rotates along with rotation of the driving pulley 246A along with driving of a transport motor (not illustrated) to guide the coin C stored in the storage boxes 238A to 238H to a reception port (not illustrated) of the coin transport cassette 30 attached to the first cassette attachment unit 234B.

The switching unit 247 is driven by control of the control unit 248. The switching unit 247 switches a guide destination of the coin C stored in the storage boxes 238A to 238H to the first route 245R (the drawer chutes 245A to 245H) or the second route 246R (the transport belt 246C).

The control unit 248 controls entire operation of the second coin handling apparatus 23. The control unit 248 causes coins, which are collected from the first coin handling apparatus 13 by the coin transport cassette 30, and the coins C, which are collected from the first POS register apparatus 14 and the second POS register apparatus 15 by the first drawer 41 and the second drawer 42, to be counted. The control unit 248 causes the coin transport cassette 30 or the drawer 40 to be replenished with the coin C stored in the storage boxes 238A to 238H. Such replenishment processing of the coin C will be described later.

Further, an operation display (not illustrated) is connected to the second coin handling apparatus 23. The operation display functions as an operation unit for inputting information on money handling in the second banknote handling apparatus 22 and the second coin handling apparatus 23, and as a display that displays information on money handling.

<Configuration of Drawer Tray>

Figure 8:
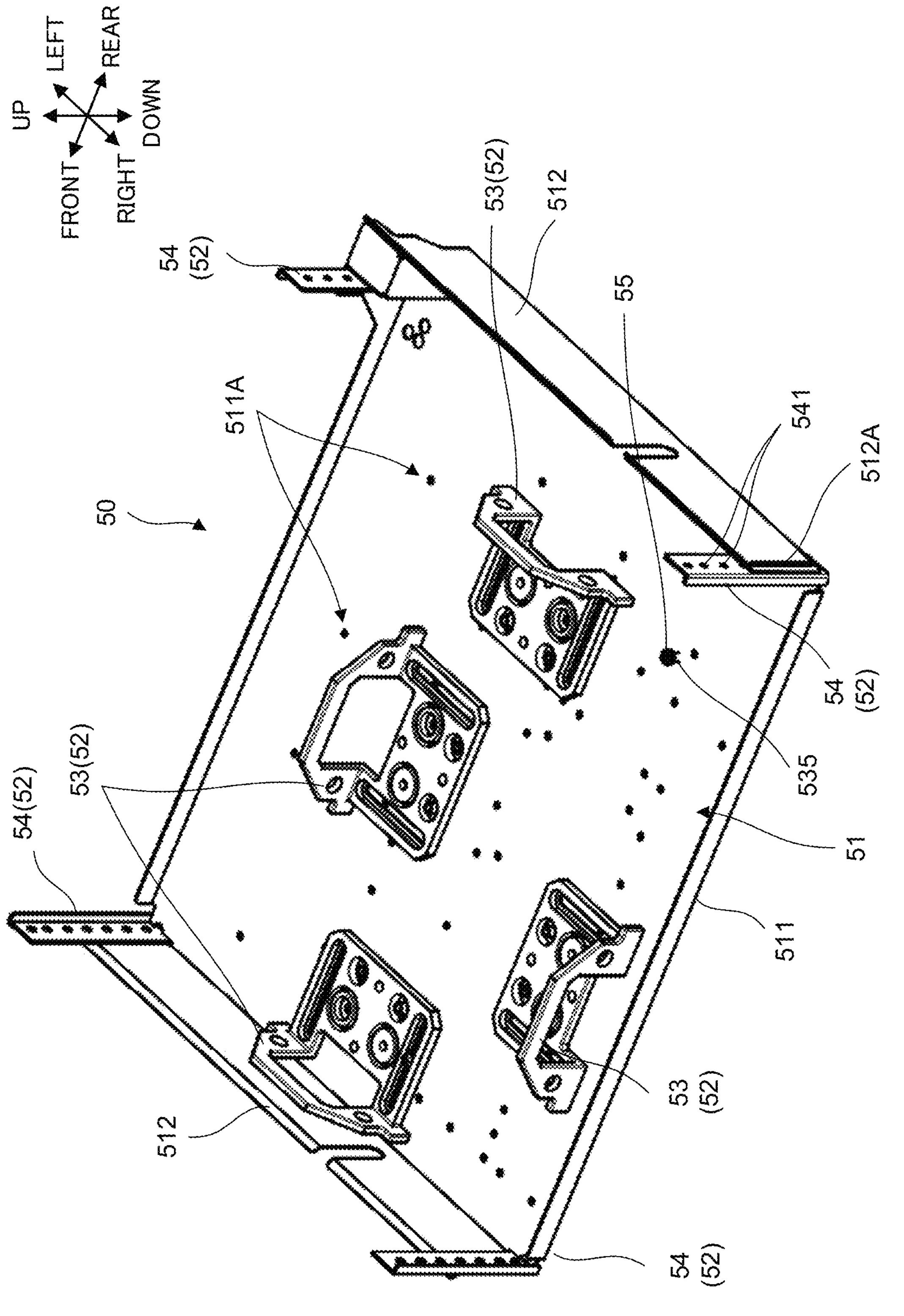
FIG. 8 is a perspective view of the drawer tray that is adjusted such that the first drawer is placed above the drawer tray according to the embodiment of the present disclosure.
Figure 9:
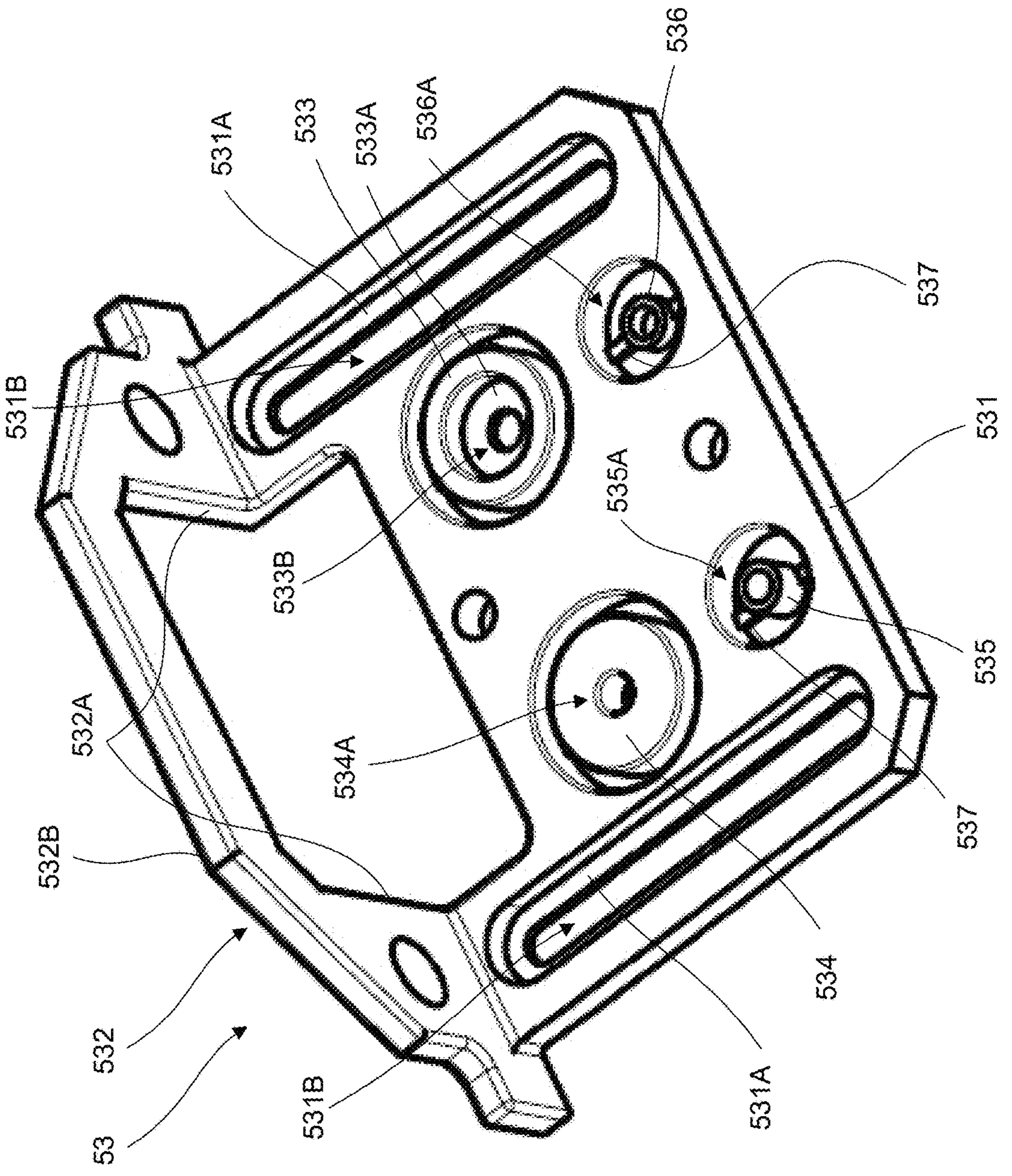
FIG. 9 is a perspective view of a horizontal position regulating member according to the embodiment of the present disclosure.

Next, a configuration of the drawer tray 50 will be described. FIG. 8 is a perspective view of the drawer tray that is adjusted such that the first drawer is placed above the drawer tray. FIG. 9 is a perspective view of a horizontal position regulating member.

As illustrated in FIG. 8, the drawer tray 50 comprises a placement unit 51 and a regulation unit 52.

The placement unit 51 comprises a placement table 511 and a pair of side surface portions 512. The drawer 40 is placed above the placement table 511. The placement table 511 is formed in a rectangular plate shape with a size larger than that of the drawer 40 in a plan view. The placement table 511 is provided with a plurality of first screw holes 511A. The pair of side surface portions 512 is provided so as to extend upward from a pair of side edges of the placement unit 51, where the side edges face each other. First adjustment long holes 512A (some of the first adjustment long holes 512A are not illustrated), which extend upward and downward and each of which penetrates each of the side surface portions 512, are provided in sides of left and right ends of each of the side surface portions 512.

The regulation unit 52 regulates a placement position of the drawer 40 in the placement unit 51. The regulation unit 52 regulates the placement position of the drawer 40 to a plurality of positions different from each other by disposition of the regulation unit 52. The regulation unit 52 regulates placement positions of a plurality of the drawers 40 of types different from each other to the plurality of positions different from each other by the disposition of the regulation unit 52. The regulation unit 52 regulates the placement position of the drawer 40 in the placement unit 51 to a position in accordance with a type of the drawer 40. The regulation unit 52 regulates the placement positions of the plurality of drawers 40 of types different from each other to positions that allow coins from a plurality of chutes of a chute unit to be guided to a plurality of the compartments provided in the drawer 40, respectively. Types of the plurality of chutes of the chute unit correspond to types of the drawer 40. The regulation unit 52 comprises a horizontal position regulating member 53 and a height position regulating member 54.

The horizontal position regulating member 53 regulates a position of the drawer 40 in a horizontal direction orthogonal to a height direction of the drawer 40. As illustrated in FIG. 8 and FIG. 9, the horizontal position regulating member 53 comprises a bottom surface abutting portion 531 and a side surface abutting portion 532.

The bottom surface abutting portion 531 is formed in a substantially square plate shape. The drawer 40 comprises a bottom surface that abuts on the bottom surface abutting portion 531. Long groove portions 531A are provided on sides of a pair of side edges of the bottom surface abutting portion 531, where the side edges face each other, and extend in a direction parallel to the side edges. The long groove portion 531A is provided with a second adjustment long hole 531B which penetrates the bottom surface abutting portion 531 and which extends in the same direction as the long groove portion 531A. A screw shaft portion of a screw (not illustrated) is inserted through the second adjustment long hole 531B, and a screw head portion of the screw is fitted into the long groove portion 531A. The depth of the long groove portion 531A is configured to be deeper than the height of the screw head and is configured such that the screw head does not protrude from an upper surface of the bottom surface abutting portion 531.

Four through-holes that penetrate the bottom surface abutting portion 531 are provided in a region of the bottom surface abutting portion 531 between a pair of long groove portions 531A. A first placement assisting member 533, a second placement assisting member 534, a third placement assisting member 535 and a fourth placement assisting member 536 are provided inside the through-holes, respectively. The first placement assisting member 533 to the fourth placement assisting member 536 are connected to the through-holes of the bottom surface abutting portion 531 via connection portions 537 having a rod shape (some of the connection portions 537 are not illustrated). The first placement assisting member 533 to the fourth placement assisting member 536 are separated from the bottom surface abutting portion 531 by cutting of the connection portions 537.

The first placement assisting member 533 is formed in a disc shape with the same thickness as that of the bottom surface abutting portion 531. The first placement assisting member 533 comprises an upper surface provided with a recessed portion 533A into which a screw head of a screw is fitted. An insertion-through hole 533B, which penetrates the first placement assisting member 533 and through which a screw shaft portion of the screw is inserted, is provided at the center of the recessed portion 533A. The depth of the recessed portion 533A is configured to be deeper than the height of the screw head and is configured such that the screw head does not protrude from an upper surface of the first placement assisting member 533.

The second placement assisting member 534 is formed in a disc shape with the same thickness as that of the bottom surface abutting portion 531 and with substantially the same shape as that of the first placement assisting member 533. An insertion-through hole 534A, which penetrates the second placement assisting member 534 and through which a screw shaft portion of a screw 55 (see FIG. 3) is inserted, is provided at the center of the second placement assisting member 534. An upper surface of the second placement assisting member 534 is not provided with a recessed portion into which a screw head is fitted as in the first placement assisting member 533.

The third placement assisting member 535 is formed in a cylindrical shape with an outer diameter smaller than that of the second placement assisting member 534 and with the same height as that of the second placement assisting member 534. The third placement assisting member 535 comprises an insertion-through hole 535A through which a screw shaft portion of a screw is inserted.

The fourth placement assisting member 536 is formed in a cylindrical shape with substantially the same outer diameter as that of the third placement assisting member 535 and with a height lower than that of the third placement assisting member 535. The fourth placement assisting member 536 comprises an insertion-through hole 536A through which a screw shaft portion of a screw is inserted.

The drawer 40 comprises a side surface portion that abuts on the side surface abutting portion 532. The side surface abutting portion 532 comprises a pair of erected portions 532A and a bridge portion 532B. The pair of erected portions 532A extends in a direction orthogonal to a plate-shaped main surface of the bottom surface abutting portion 531. The bridge portion 532B connects upper ends of the pair of erected portions 532A. The pair of erected portions 532A is provided such that a direction in which the pair of erected portions 532A is side by side at a side edge of the bottom surface abutting portion 531 is orthogonal to a direction in which the long groove portion 531A extends.

For example, the bottom surface abutting portion 531, the side surface abutting portion 532, and the first placement assisting member 533 to the fourth placement assisting member 536 are integrally molded.

The horizontal position regulating member 53 is attached to the placement unit 51 by a screw (not illustrated) whose screw shaft portion is inserted through the second adjustment long hole 531B of the bottom surface abutting portion 531 and is screwed into the first screw hole 511A of the placement unit 51. The first screw hole 511A and the screw function as a positioning unit that positions the regulation unit 52 with respect to the placement unit 51.

As illustrated in FIG. 8, the height position regulating member 54 is formed in a substantially rectangular plate shape. The height position regulating member 54 is provided with a plurality of second screw holes 541 along a longitudinal direction of the height position regulating member 54. The height position regulating member 54 is attached to the side surface portion 512 by a screw (not illustrated) whose screw shaft portion is inserted through the first adjustment long hole 512A of the side surface portion 512 and is screwed into the second screw hole 541 such that the height position regulating member 54 extends upward and downward. The second screw hole 541 and the screw function as the positioning unit that positions the regulation unit 52 with respect to the placement unit 51. The number of screws for attaching one height position regulating member 54 to the side surface portion 512 is not particularly limited, but is preferably not less than two such that the height position regulating member 54 does not deviate.

<Method of Placing Drawer Above Drawer Tray>

Figure 10:
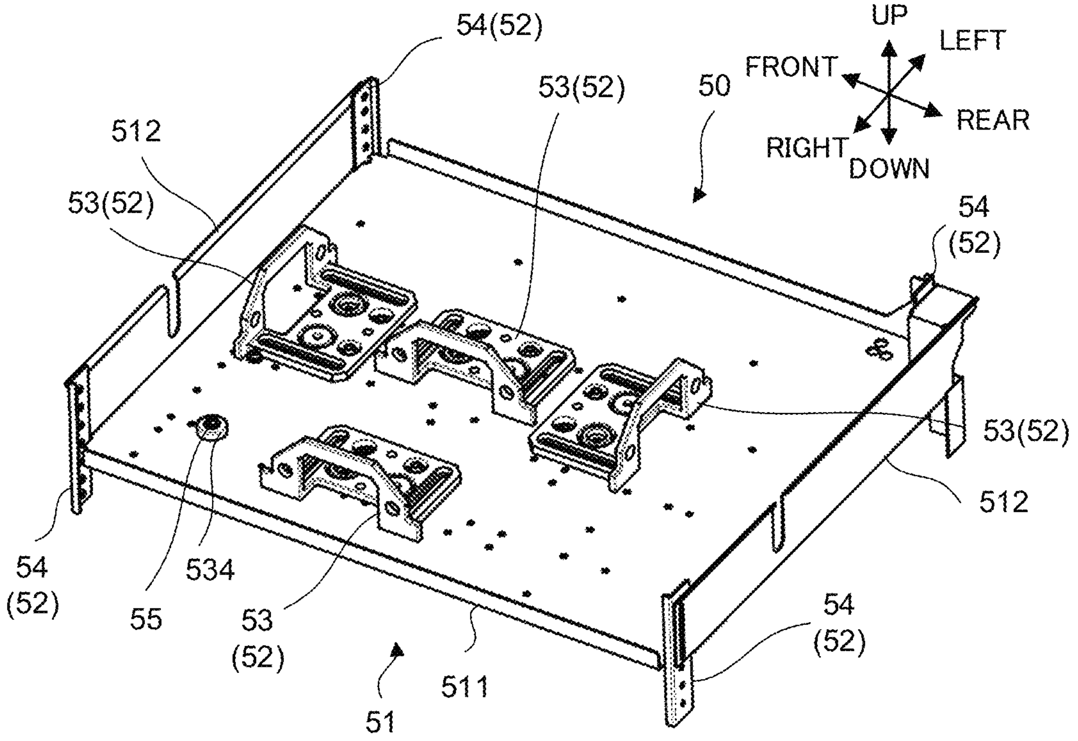
FIG. 10 is a perspective view of the drawer tray that is adjusted such that the second drawer is placed above the drawer tray according to the embodiment of the present disclosure.
Figure 11:
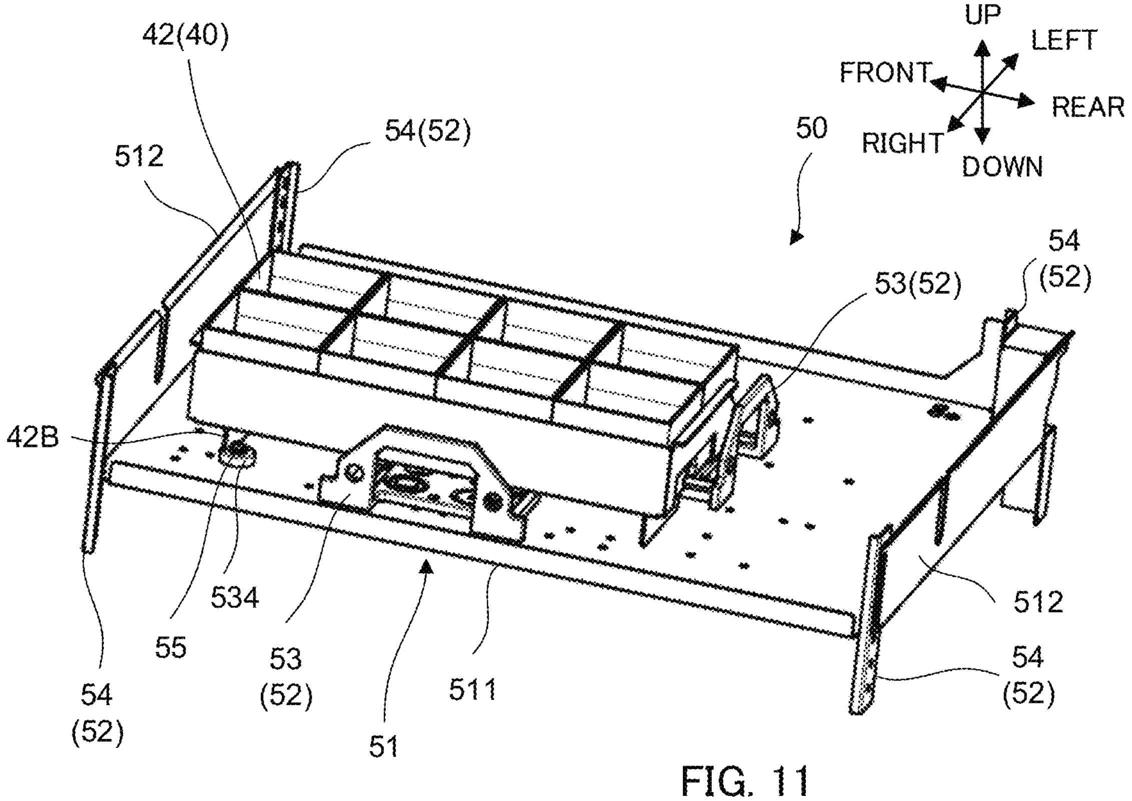
FIG. 11 is a perspective view illustrating a state in which the second drawer is placed in an opposite orientation above the drawer tray according to the embodiment of the present disclosure.
Figure 12:
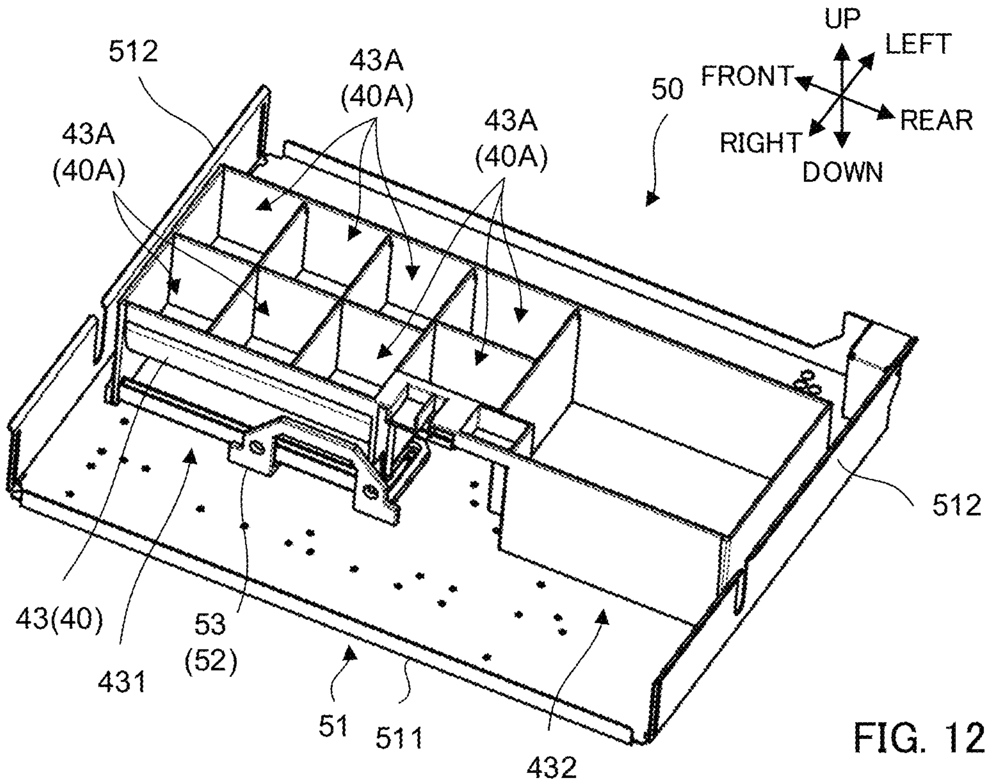
FIG. 12 is a perspective view illustrating a state in which a third drawer is placed in a correct orientation above the drawer tray according to the embodiment of the present disclosure.
Figure 13:
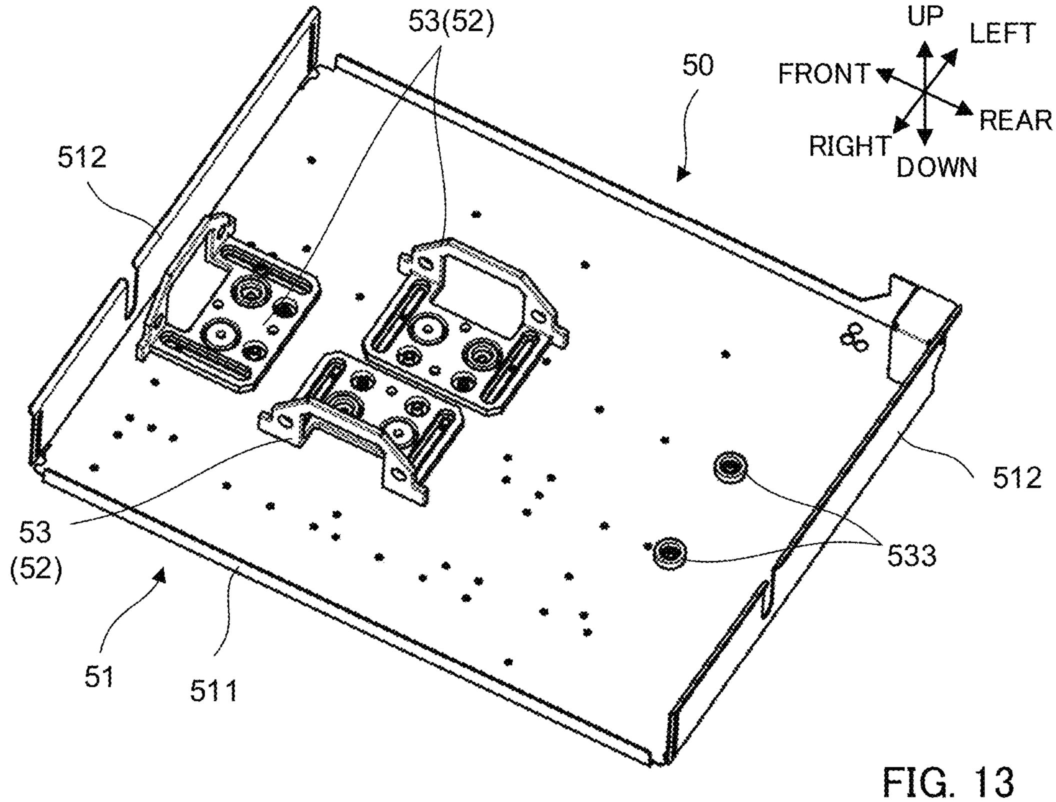
FIG. 13 is a perspective view of the drawer tray that is adjusted such that the third drawer is placed above the drawer tray according to the embodiment of the present disclosure.

Next, a method of placing the drawer 40 above the drawer tray 50 will be described. FIG. 10 is a perspective view of the drawer tray that is adjusted such that the second drawer is placed above the drawer tray. FIG. 11 is a perspective view illustrating a state in which the second drawer is placed in an opposite orientation above the drawer tray. FIG. 12 is a perspective view illustrating a state in which a third drawer is placed in a correct orientation above the drawer tray. FIG. 13 is a perspective view of the drawer tray that is adjusted such that the third drawer is placed above the drawer tray.

At least one of a height of lower ends (coin C-outlets) of the drawer chutes 245A to 245H and a position thereof in the horizontal direction when a chute unit is attached to the second coin handling apparatus 23 may vary depending on a type of the chute unit. At least one of a height of upper ends of the respective compartments 40A of the drawer 40 and a position thereof in the horizontal direction may also vary depending on a type of the drawer 40. In order to prevent the coin C from a chute unit from being discharged to a position deviating from the respective compartments 40A of the drawer 40 when the drawer 40 is replenished with the coin C by using the second coin handling apparatus 23, the coin C-outlets of the respective drawer chutes 245A to 245H are preferably located in the respective compartments 40A of the drawer 40 in a plan view regardless of the type of the chute unit and the type of the drawer 40. Further, especially in a case where the coin C is discharged obliquely downward from a chute unit, a positional relationship in the up-down direction between the lower ends of the respective drawer chutes 245A to 245H and the upper ends of the respective compartments 40A of the drawer 40 is preferably configured to be constant.

In order to prevent the coin C from being discharged to a position deviating from the respective compartments 40A, a clerk adjusts a position of the drawer 40 in the height direction and a position thereof in the horizontal position in the drawer tray 50. Hereinafter, a case where position adjustment in the height direction is performed and then position adjustment in the horizontal direction is performed will be described as an example, but the order thereof may be reversed.

[Method of Placing First Drawer Above Drawer Tray]

First, a method of placing the first drawer 41 as illustrated in FIG. 2 above the drawer tray 50 will be described. An operator adjusts fixing positions of the respective height position regulating members 54 with respect to the placement unit 51 such that a difference between a height of the upper ends of the respective compartments 41A of the first drawer 41 and a height of the lower ends of the drawer chutes 245A to 245H illustrated in FIG. 5 when the first drawer 41 is attached to the second coin handling apparatus 23 is within an allowable range. The difference between the height of the upper ends of the respective compartments 41A of the first drawer 41 and the height of the lower ends of the drawer chutes 245A to 245H is preferably zero.

The operator loosely screws a screw, which has been inserted through the first adjustment long hole 512A of the placement unit 51, into the second screw hole 541 of the height position regulating member 54. Note that, in a case where the height position regulating member 54 is already fixed to the placement unit 51 by a screw, the operator loosens the screw that has been screwed into the second screw hole 541. The operator finely adjusts the fixing position by continuously sliding the height position regulating member 54 upward and downward so as to move the screw in the first adjustment long hole 512A. The operator retightens the screw at a desired fixing position to fix the height position regulating member 54.

Next, in a case where the first drawer 41 is attached to the second coin handling apparatus 23, the operator adjusts the fixing positions of the horizontal position regulating members 53 with respect to the placement unit 51 such that the coin C-outlets of the respective drawer chutes 245A to 245H are located in the respective compartments 41A of the first drawer 41 in a plan view, where arrangement positions of the respective compartments 41A in the horizontal direction are regulated by the horizontal position regulating members 53. Here, the openings of the respective compartments 41A of the first drawer 41 are formed to be larger than the coin C-outlets of the respective drawer chutes 245A to 245H. Each position of the coin-C outlets of the respective drawer chutes 245A to 245H in a plan view is preferably each center of the respective compartments 41A of the first drawer 41, but may deviate outward from each center.

The operator identifies two first screw holes 511A suitable for fixing one horizontal position regulating member 53, and loosely screws screws, which have been inserted through two second adjustment long holes 531B of the horizontal position regulating member 53, respectively, into the identified first screw holes 511A. Note that, in a case where the horizontal position regulating member 53 is already fixed to the placement unit 51 by screws, the operator loosens the screws screwed into the first screw holes 511A. The operator finely adjusts the fixing position of the horizontal position regulating member 53 by continuously sliding the horizontal position regulating member 53 in the horizontal direction so as to move the screws in the second adjustment long holes 531B. The operator retightens the screws at a desired fixing position to fix the horizontal position regulating member 53. Note that, the operator's fixing position adjustment operation of the horizontal position regulating member 53 can be facilitated by providing a mark indicating a fixing position suitable for each drawer 40 in the placement table 511 of the placement unit 51. Further, the fixing position adjustment operation of the horizontal position regulating member 53 may be performed in a state in which the first drawer 41 is not placed in the placement unit 51 as illustrated in FIG. 8, or may be performed in a state in which the first drawer 41 is placed in the placement unit 51 as illustrated in FIG. 2.

Further, when needed, the operator separates at least one placement assisting member of the first placement assisting member 533 to the fourth placement assisting member 536 from the horizontal position regulating member 53 before being attached to the placement unit 51 or from the horizontal position regulating member 53 which is not attached to the placement unit 51, and fixes the at least one placement assisting member to the placement unit 51 by a screw(s). For example, as illustrated in FIG. 8, the third placement assisting member 535 that has been separated is fixed to the first screw hole 511A by the screw 55. The third placement assisting member 535 is fixed at a position such that when the first drawer 41 is placed in a correct orientation above the drawer tray 50, the third placement assisting member 535 enters into a groove portion 41B (see FIG. 2) provided in a side surface portion of the first drawer 41, and that when the first drawer 41 is placed in a right-left reversed orientation above the drawer tray 50, a screw head of the screw 55 comes into contact with a lower surface of the first drawer 41.

The operator places the first drawer 41 in the correct orientation as illustrated in FIG. 2 above the drawer tray 50 to which four horizontal position regulating members 53 and one third placement assisting member 535 have been fixed as illustrated in FIG. 8. At this time, the side surface abutting portions 532 of the four horizontal position regulating members 53 abut on front, rear, left and right side surface portions of the first drawer 41 or the like so that a placement position of the first drawer 41 in the drawer tray 50 in the horizontal direction is regulated. Since the third placement assisting member 535 enters the groove portion 41B of the first drawer 41, the first drawer 41 takes an attitude without inclination.

Although not illustrated, in a case where the first drawer 41 is placed in the right-left reversed orientation above the drawer tray 50, on the other hand, the screw head of the screw 55 that fixes the third placement assisting member 535 comes into contact with the lower surface of the first drawer 41 so that the first drawer 41 takes an attitude with inclination. That is, the third placement assisting member 535 is and functions as a misplacement prevention member which forms a placement assisting unit and which prevents the drawer 40 from being placed in an orientation different from a predetermined orientation. The operator can notice, by looking at the first drawer 41 which is inclined, that the first drawer 41 has been placed in the right-left reversed orientation, and can place the first drawer 41 again in the correct orientation as illustrated in FIG. 2. Note that, the fourth placement assisting member 536 may be used instead of the third placement assisting member 535 to function as the misplacement prevention member.

[Method of Placing Second Drawer Above Drawer Tray]

Next, a method of placing the second drawer 42 as illustrated in FIG. 3 above the drawer tray 50 will be described. Note that, the same work as in the method of placing the first drawer 41 described above will be briefly described or a description thereof will be omitted. An operator adjusts the fixing positions of the respective height position regulating members 54 with respect to the placement unit 51 such that a difference between a height of upper ends of the respective compartments 42A and the height of the lower ends of the drawer chutes 245A to 245H when the second drawer 42 is attached to the second coin handling apparatus 23 is within an allowable range.

As illustrated in FIG. 2 and FIG. 3, the second drawer 42 is formed to be lower than the first drawer 41. When the fixing positions of the respective height position regulating members 54 with respect to the placement unit 51 are configured to be the same as in the case of the first drawer 41, positions of the upper ends of the respective compartments 42A when the second drawer 42 is attached to the second coin handling apparatus 23 are lower than positions of the upper ends of the respective compartments 41A of the first drawer 41. In this case, the positions of the upper ends of the respective compartments 42A and the positions of the lower ends of the drawer chutes 245A to 245H may be too far from each other so that the coin C may not enter the respective compartments 42A. Accordingly, the operator adjusts the fixing positions of the respective height position regulating members 54 such that portions of the respective height position regulating members 54, where the portions protrude downward from the placement unit 51, have a length longer than that in the case of the first drawer 41 as illustrated in FIG. 10.

Next, the operator adjusts the fixing positions of the horizontal position regulating members 53 such that the coin C-outlets of the respective drawer chutes 245A to 245H are located in the respective compartments 42A of the second drawer 42 in a plan view, where arrangement positions of the respective compartments 42A in the horizontal direction are regulated by the horizontal position regulating members 53.

Further, when needed, the operator separates at least one placement assisting member of the first placement assisting member 533 to the fourth placement assisting member 536 from the horizontal position regulating member 53, and fixes the at least one placement assisting member to the placement unit 51 by a screw(s). For example, the operator fixes the second placement assisting member 534, which has been separated, to the first screw hole 511A by the screw 55 as illustrated in FIG. 10. The second placement assisting member 534 is fixed at a position such that when the second drawer 42 is placed in a correct orientation above the drawer tray 50, the second placement assisting member 534 abuts on a side surface portion of the second drawer 42 or does not abut on the second drawer 42, and that when the second drawer 42 is placed in a right-left reversed orientation above the drawer tray 50, the second placement assisting member 534 abuts on a drawer leg portion 42B (see FIG. 11) protruding downward from a lower surface of the second drawer 42.

The operator places the second drawer 42 in the correct orientation as illustrated in FIG. 3 above the drawer tray 50 to which four horizontal position regulating members 53 and one second placement assisting member 534 are fixed as illustrated in FIG. 10. At this time, the side surface abutting portions 532 of the four horizontal position regulating members 53 abut on front, rear, left and right side surface portions of the second drawer 42 or the like so that a placement position of the second drawer 42 in the drawer tray 50 in the horizontal direction is regulated. Since the second placement assisting member 534 abuts on the side surface portion of the second drawer 42 or does not abut on the second drawer 42, the second drawer 42 takes an attitude without inclination. Further, positions of the respective compartments 42A with respect to the placement unit 51 in a plan view become substantially the same as positions of the respective compartments 41A with respect to the placement unit 51 in a plan view. Further, a length between lower ends of the respective height position regulating members 54 and the upper ends of the respective compartments 42A in a side view becomes substantially the same as a length between the lower ends of the respective height position regulating members 54 and the upper ends of the respective compartments 41A in a side view.

In a case where the second drawer 42 is placed in the right-left reversed orientation above the drawer tray 50 as illustrated in FIG. 11, on the other hand, the second placement assisting member 534 abuts on the drawer leg portion 42B of the second drawer 42 so that the second drawer 42 takes an attitude with inclination. That is, the second placement assisting member 534 functions as the misplacement prevention member. The operator can notice, by looking at the second drawer 42 which is inclined, that the second drawer 42 has been placed in the right-left reversed orientation, and can place the second drawer 42 again in the correct orientation as illustrated in FIG. 3. Note that, the first placement assisting member 533 may be used instead of the second placement assisting member 534 to function as the misplacement prevention member.

[Method of Placing Drawer of Different Type from First Drawer and Second Drawer Above Drawer Tray]

Next, a method of placing a third drawer 43 as illustrated in FIG. 12 above the drawer tray 50 will be described. Note that, the same work as in the methods of placing the first drawer 41 and the second drawer 42 described above will be briefly described or a description thereof will be omitted. Further, a description of fixing position adjustment of the height position regulating member 54 will be omitted.

The third drawer 43 (the drawer 40) comprises a frontward portion 431 and a rearward portion 432. The frontward portion 431 is provided with a plurality of compartments 43A (the compartments 40A) in which the coin C is stored. The rearward portion 432 is connected to a rear side of the frontward portion 431. The third drawer 43 is formed to have a length in the front-rear direction which is longer than those of the first drawer 41 and the second drawer 42.

When a change fund is loaded to the third drawer 43, a chute unit in which positions of outlets of a plurality of drawer chutes with respect to the storage boxes 238A to 238D illustrated in FIG. 5 are different from those in the first chute unit 245J and the second chute unit 245K is used. Thus, as illustrated in FIG. 13, the operator adjusts the positions of the horizontal position regulating members 53 such that positions of the respective compartments 43A with respect to the placement unit 51 in a plan view differ from the positions of the respective compartments 41A and 42A with respect to the placement unit 51 in a plan view. Further, the third drawer 43 is configured such that when the horizontal position regulating member 53 is disposed so as to abut on a front surface portion of the frontward portion 431, the rearward portion 432 comes into contact with the side surface portion 512 and the respective compartments 43A are located downward from the outlets of the drawer chutes. Thus, positions of three horizontal position regulating members 53 that abut on front, left and right side surface portions of the third drawer 43, respectively, are adjusted.

When the three horizontal position regulating members 53 are disposed, front-side, left-side and right-side portions of the third drawer 43 are placed on the bottom surface abutting portions 531, but a rear-side portion of the third drawer 43 is not placed on the bottom surface abutting portion 531 so that the third drawer 43 may be inclined in a way that the rear-side portion is lowered. Accordingly, the operator separates the first placement assisting member 533 from the horizontal position regulating member 53 and, as illustrated in FIG. 13, fixes the first placement assisting member 533 to the placement unit 51 by a screw.

The operator places the third drawer 43 in a correct orientation as illustrated in FIG. 12 above the drawer tray 50 to which three horizontal position regulating members 53 and two first placement assisting members 53 are fixed as illustrated in FIG. 13. At this time, the side surface abutting portions 532 of the three horizontal position regulating members 53 abut on the front, left and right side surface portions of the third drawer 43, respectively, and the side surface portion 512 of the drawer tray 50 abuts on a rear side surface portion of the third drawer 43 so that a placement position of the third drawer 43 in the drawer tray 50 in the horizontal direction is regulated. Further, since the front-side, left-side and right-side portions of the third drawer 43 are placed on the bottom surface abutting portions 531 and the rear-side portion of the third drawer 43 is placed on the first placement assisting member 533 having the same thickness as the bottom surface abutting portion 531 so that the third drawer 43 is restrained from taking an attitude with inclination. That is, the first placement assisting member 533 is and functions as an inclination prevention member (spacer) which forms the placement assisting unit and which is provided between a lower surface of the third drawer 43 and an upper surface (placement surface) of the placement table 511 of the placement unit 51 to prevent the drawer 40 from being inclined.

<Operation of Money Handling System>

As operation of the money handling system 1, replenishment processing of the coin transport cassette 30 and the drawer 40 with the coin C in the second coin handling apparatus 23 as illustrated in FIG. 7A and FIG. 7B will be described. Note that, the second coin handling apparatus 23 is also capable of replenishing only the coin transport cassette 30 or only the drawer 40 with the coin C. Further, a description of counting processing of the coins C collected by the coin transport cassette 30 or the drawer 40 in the second coin handling apparatus 23 will be omitted.

First, before setting the drawer 40 in the second coin handling apparatus 23, an operator confirms whether adjustment of the drawer tray 50 contained in the drawer portion 234A is required. In a case where the adjustment is required, the operator takes out the drawer tray 50 from the drawer portion 234A. The operator adjusts the fixing positions of the horizontal position regulating members 53 and the height position regulating member 54 of the drawer tray 50 as described above in accordance with a type (shape) of a chute unit of the second coin handling apparatus 23 and a type (shape) of the drawer 40 that is attached to the drawer tray 50. Further, the operator fixes the first placement assisting member 533 to the fourth placement assisting member 536 to the drawer tray 50 when needed.

Thereafter, the operator sets the drawer tray 50 into the drawer portion 234A, and then attaches the first drawer 41, which is empty, to the drawer tray 50 as illustrated in FIG. 2, for example. Note that, the operator may attach the first drawer 41 to the drawer tray 50 and then set the drawer tray 50 into the drawer portion 234A.

In a case where the first drawer 41 as well as the coin transport cassette 30 are replenished with coins, the operator attaches the coin transport cassette 30, which is empty, to the first cassette attachment unit 234B. The operator pushes and inserts the drawer portion 234A into the housing 231 to realize a state in which the coin C can be stored in the coin transport cassette 30 and the first drawer 41 as illustrated in FIG. 5 and FIG. 6.

When the drawer portion 234A is put into the housing 231, the control unit 248 of the second coin handling apparatus 23 controls the coin transport cassette 30 such that a reception port (not illustrated) of the coin transport cassette 30 is opened. When the reception port of the coin transport cassette 30 is opened, the control unit 248 causes the coin transport cassette 30 and the first drawer 41 to be replenished with the coins C of predetermined denominations by a predetermined number.

For example, the control unit 248 controls the storage boxes 238A to 238H and the switching unit 247 such that the coin C fed out of a predetermined storage box of the storage boxes 238A to 238H is guided to the first route 245R (the drawer chutes 245A to 245H) as indicated by an arrow Cl in FIG. 6. The first drawer 41 is replenished with the coin C guided to the first route 245R. Further, when the replenishment processing of the first drawer 41 with the coin C in the storage boxes 238A to 238H is completed, the control unit 248 controls the storage boxes 238A to 238H and the switching unit 247 such that the coin C fed out of a predetermined storage box of the storage boxes 238A to 238H is guided to the second route 246R (the transport belt 246C). The control unit 248 further controls the transport motor of the second route forming portion 246 such that the coin transport cassette 30 is replenished with the coin C guided onto the transport belt 246C through the reception port. In this manner, the coin transport cassette 30 and the first drawer 41 can be replenished with the coin C in the storage boxes 238A to 238H without detaching the coin transport cassette 30 and the first drawer 41 from the second coin handling apparatus 23.

When the replenishment processing of the coin transport cassette 30 and the first drawer 41 with the coin C is completed, the control unit 248 controls the coin transport cassette 30 such that the reception port of the coin transport cassette 30 is closed.

Thereafter, the operator draws out the drawer portion 234A onto a side of the operator, and detaches the coin transport cassette 30 and the first drawer 41 from the second coin handling apparatus 23.

Further, in a case where the second drawer 42 is replenished with the coin C, the operator detaches the drawer tray 50 from the second coin handling apparatus 23. The operator then readjusts the fixing positions of the horizontal position regulating members 53 and the height position regulating member 54, and attaches the second drawer 42, which is empty, to the drawer tray 50 as illustrated in FIG. 3. Thereafter, the operator pushes and inserts the drawer portion 234A into the housing 231. When the drawer portion 234A is put into the housing 231, the control unit 248 of the second coin handling apparatus 23 causes the second drawer 42 to be replenished with the coin C.

At this time, the positions of the coin C-outlets of the respective drawer chutes 245A to 245H in a plan view are located in the respective compartments 42A. Further, a difference between the height of the upper ends of the respective compartments 42A and the height of the lower ends of the drawer chutes 245A to 245H becomes almost the same as the difference between the height of the upper ends of the respective compartments 41A and the height of the lower ends of the drawer chutes 245A to 245H. Thus, even without replacing the first chute unit 245J and the second chute unit 245K with other chute units, it is possible to restrain the coin C from being discharged to a position deviating from the respective compartments 42A, and it is possible to appropriately replenish the second drawer 42 with the coin C.

<Working Effect of Embodiment>

The drawer tray 50 comprises: the placement unit 51 where the drawer 40 is placed; and the regulation unit 52 that regulates the placement position of the drawer 40 in the placement unit 51 to a position in accordance to a type of the drawer 40. Thus, placement position regulation by the regulation unit 52 in accordance with each of the first drawer 41 and the second drawer 42 makes it possible to set the positions of the respective compartments 41A and 42A in a case where the drawer tray 50 is attached to the second coin handling apparatus 23 as positions at which the coin C from the drawer chutes 245A to 245H can be received. Accordingly, it is possible to replenish the second drawer 42 with the coin C without performing complicated work of replacing the drawer chutes 245A to 245H after replenishing the first drawer 41 with the coin C, for example.

The regulation unit 52 comprises the horizontal position regulating member 53 that regulates a position of the drawer 40 in the horizontal direction. Thus, it is possible to regulate the placement position of the drawer 40 such that the outlets of the drawer chutes 245A to 245H are located near the centers of the respective compartments 41A and 42A in a plan view, and it is possible to restrain the coin C from being discharged to a position deviating from the respective compartments 41A and 42A.

The horizontal position regulating member 53 is provided so as to slide in the horizontal direction with respect to the placement unit 51. Thus, it is possible to finely adjust a position of the horizontal position regulating member 53, and it is possible to restrain a gap from occurring between the drawer 40 and the horizontal position regulating member 53. Accordingly, it is possible to regulate the placement position of the drawer 40 more appropriately.

The regulation unit 52 comprises the height position regulating member 54 that regulates a position of the drawer 40 in the height direction. Thus, it is possible to restrain the positions of the upper ends of the respective compartments 41A and 42A and the positions of the lower ends of the drawer chutes 245A to 245H from being too far from each other. Especially in a case where the coin C is discharged obliquely downward from the drawer chutes 245A to 245H, it is possible to restrain the coin C from being discharged to a position deviating from the respective compartments 41A and 42A.

The height position regulating member 54 is provided so as to slide in the height direction with respect to the placement unit 51. Thus, it is possible to finely adjust a position of the height position regulating member 54, and it is possible to restrain the positions of the upper ends of the respective compartments 40A and the positions of the lower ends of the drawer chutes 245A to 245H from being too far from each other in the drawer 40 with various heights.

The horizontal position regulating member 53 is provided with the first placement assisting member 533 to the fourth placement assisting member 536 which are separable and each of which function as the misplacement prevention member. Thus, it is possible to prevent the drawer 40 from being placed in an orientation different from a predetermined orientation by attaching the first placement assisting member 533 to the fourth placement assisting member 536 to the placement unit 51. Further, since the first placement assisting member 533 to the fourth placement assisting member 536 are integrally provided in the horizontal position regulating member 53, it is possible to reduce the number of parts, and a process of manufacturing parts.

The horizontal position regulating member 53 is provided with the first placement assisting member 533 which is separable and which functions as the inclination prevention member. Thus, the horizontal position regulating members 53 can be disposed on front, left and right sides of the third drawer 43 as illustrated in FIG. 13, for example. However, even in a case where the horizontal position regulating member 53 cannot be disposed on a rear side of the third drawer 43, attachment of the first placement assisting member 533 to a position facing a lower surface of the rear side of the third drawer 43 makes it possible to restrain the third drawer 43 from being inclined.

[Variations of Embodiment]

It goes without saying that the present disclosure is not limited to those indicated in the embodiment described thus far, and various modifications can be made without departing from the spirit of the present disclosure. The embodiment described above and variations that are indicated below may be combined in any way as long as it is applicable.

<Variation 1>

The drawer tray for the first drawer 41 illustrated in FIG. 8 and the drawer tray for the second drawer 42 illustrated in FIG. 10 may be prepared separately in advance. Such a configuration makes it possible to replenish the drawer 40 of different types with the coin C by a simple method of only replacing the drawer tray.

<Variation 2>

One drawer tray may be prepared in advance in which the regulation unit 52 is disposed on one main surface (first surface) of the placement table 511 so as to regulate the placement position of the first drawer 41, and in which the regulation unit 52 is disposed on the other main surface (second surface) of the placement table 511 so as to regulate the placement position of the second drawer 42. Such a configuration makes it possible to replenish the drawer 40 of different types with the coin C by a simple method of only turning over the drawer tray.

<Variation 3>

Figure 14:
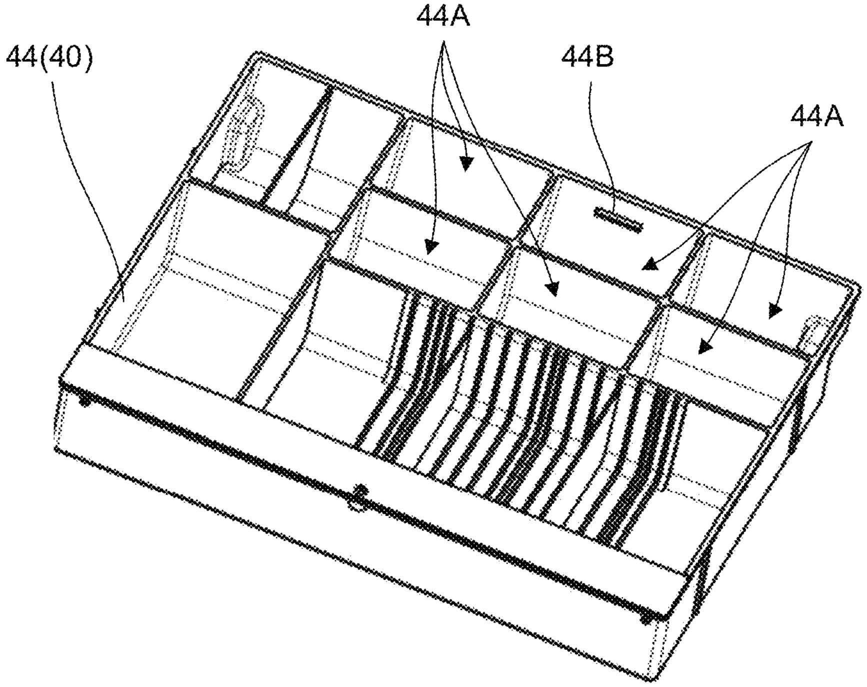
FIG. 14 is a perspective view of a drawer comprising an engagement hole according to Variation 3 of the present disclosure.
Figure 15:
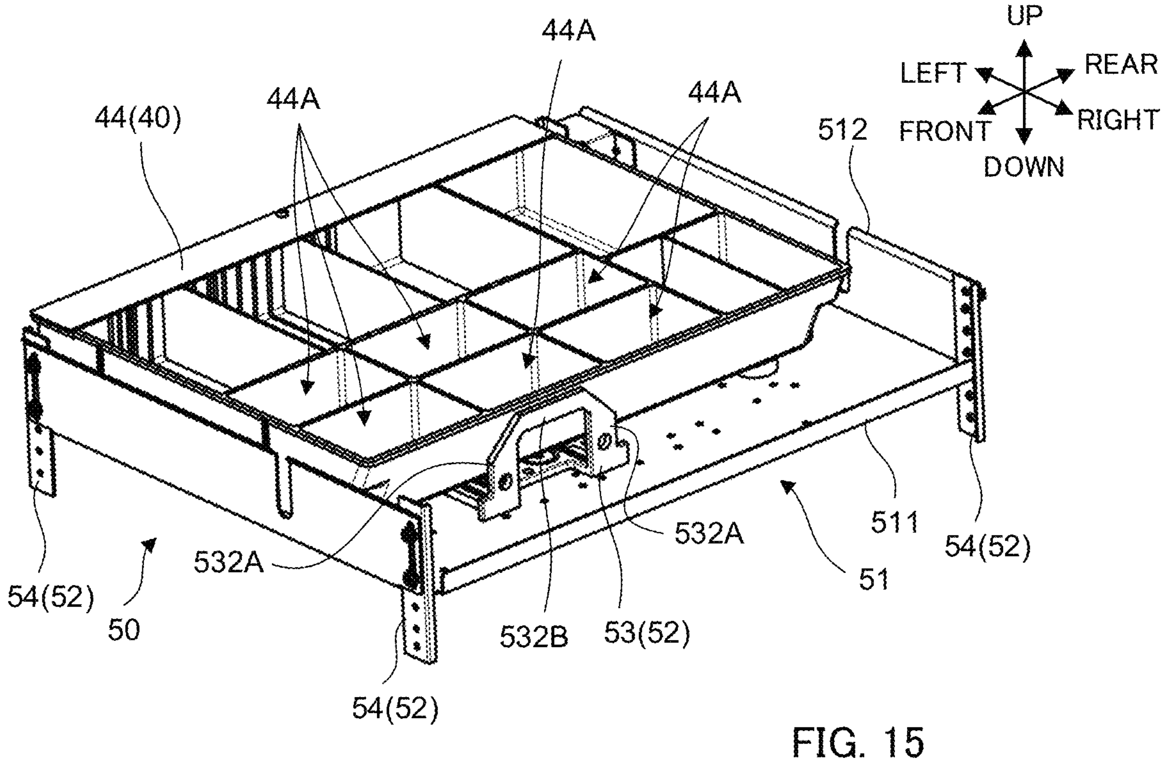
FIG. 15 is a perspective view illustrating a state in which the drawer is placed above the drawer tray according to Variation 3 of the present disclosure.

As illustrated in FIG. 14, a drawer 44 comprising a plurality of compartments 44A may be provided with an engagement hole 44B that engages with a protrusion of a POS register apparatus when the drawer 44 is attached to the POS register apparatus. The engagement hole 44B is an example of a hole portion. The drawer tray 50 may be configured such that the coin C does not pass through the engagement hole 44B and exit the drawer 44 at the time of the replenishment processing of the coin C in the second coin handling apparatus 23. For example, as illustrated in FIG. 15, the horizontal position regulating member 53 may be provided such that the engagement hole 44B is closed by the bridge portion 532B of the side surface abutting portion 532.

<Variation 4>

The drawer tray may be provided with a horizontal driving mechanism that automatically slides a plurality of horizontal position regulating members 53 on the placement table 511, and the placement position of the drawer 40 may be regulated as follows. When the drawer tray where the drawer 40 is placed is put into the second coin handling apparatus 23, a type of the drawer 40 is detected by a sensor and/or a camera. The horizontal driving mechanism may be driven based on a result of the detection to move the horizontal position regulating member 53 and to regulate a placement position of the drawer 40 in the horizontal direction. Further, a vertical driving mechanism that automatically slides a plurality of height position regulating members 54 with respect to the placement table 511 may be provided, and the vertical driving mechanism may be driven based on a result of the detection by the sensor and/or the camera to regulate a placement position of the drawer 40 in the height direction.

<Other Variations>

The drawer tray 50 may be fixed to the drawer portion 234A. The drawer tray 50 may not have a function of regulating the position of the drawer 40 in the horizontal direction or a function of regulating the position of the drawer 40 in the height direction.

The drawer tray 50 may not have a function of sliding the horizontal position regulating member 53. For example, the horizontal position regulating member 53 may be fixed to the placement table 511 by providing a protrusion on a lower surface of the bottom surface abutting portion 531 without providing the second adjustment long hole 531B, and by fitting the protrusion into a hole of the placement table 511. Further, the horizontal position regulating member 53 may be provided with, instead of the second adjustment long hole 531B, a through-hole through which a screw shaft portion of a screw is inserted.

The drawer tray 50 may not have a function of sliding the height position regulating member 54. For example, a through-hole through which a screw shaft portion of a screw is inserted may be provided instead of the first adjustment long hole 512A.

The first placement assisting member 533 to the fourth placement assisting member 536 and the horizontal position regulating member 53 may be manufactured as separate members, respectively.

As a method of positioning the drawer 40 in the drawer tray 50, the following method may be used. First, an operator prepares a plurality of positioning members. Each of the positioning members is desirably formed of a transparent sheet-like member with a size in a plan view being substantially the same as a size of the placement table 511 in a plan view, for example. Outlets of a plurality of draw chutes forming chute units of types different from each other are printed on each of the positioning members.

In a case where a chute unit corresponding to the drawer 40 that is placed above the drawer tray 50 is not attached to the second coin handling apparatus 23, the operator, for example, sequentially places the plurality of positioning members on the drawer 40, and selects a positioning member in which outlets of all drawer chutes are located in the respective compartments 40A of the drawer 40 (work 1). The operator then attaches a chute unit of a type corresponding to the selected positioning member to the second coin handling apparatus 23 (work 2). Before or after attachment of the chute unit to the second coin handling apparatus 23, the operator attaches the horizontal position regulating member 53 to the placement table 511 with reference to positions of outlets of drawer chutes printed on the selected positioning member (work 3). Then, the operator places the drawer 40 in accordance with the horizontal position regulating member 53 (work 4).

Note that, in a case where a chute unit corresponding to the drawer 40 is attached to the second coin handling apparatus 23 and an operator grasps a type of the chute unit, the operator may select a positioning member corresponding to the chute unit and perform the works 3 and 4 described above. Further, in a case where a chute unit corresponding to the drawer 40 is attached to the second coin handling apparatus 23 and an operator does not grasp a type of the chute unit, the operator may perform the works 1, 3 and 4 described above.

[Reference Embodiment]

Figure 16A:
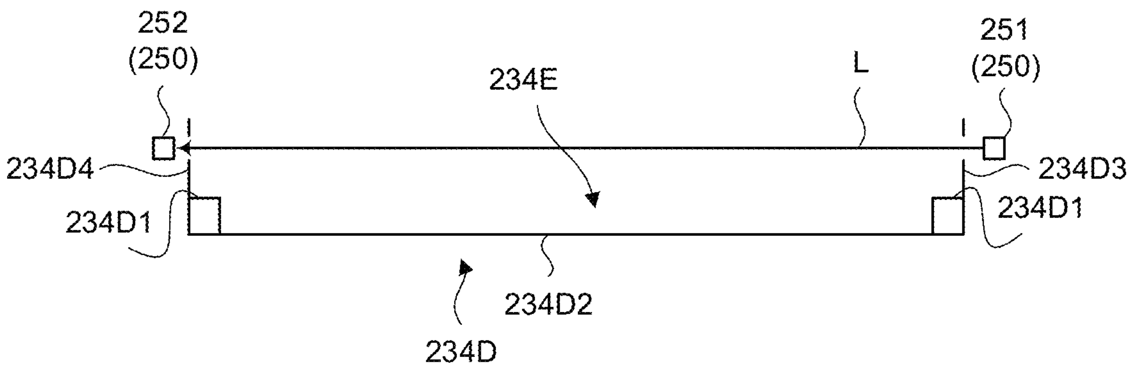
FIG. 16A is a schematic diagram illustrating a schematic configuration of a main part of a dispensing unit according to a reference embodiment of the present disclosure, illustrating a state in which the drawer tray is not attached.
Figure 16B:
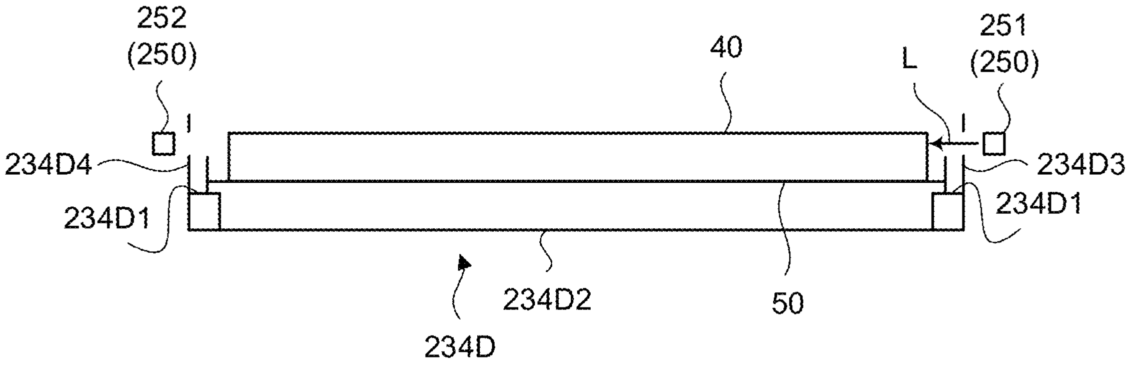
FIG. 16B is a schematic diagram illustrating the schematic configuration of the main part of the dispensing unit according to the reference embodiment of the present disclosure, illustrating a state in which the drawer tray is attached.
Figure 16C:
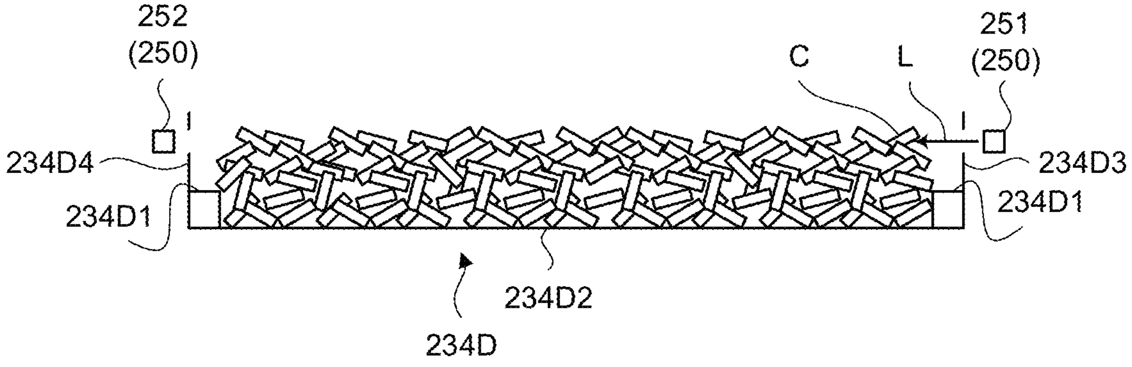
FIG. 16C is a schematic diagram illustrating the schematic configuration of the main part of the dispensing unit according to the reference embodiment of the present disclosure, illustrating a state in which a collection housing becomes full.

Next, a reference embodiment of the present disclosure will be described. FIG. 16A is a schematic diagram illustrating a schematic configuration of a main part of the dispensing unit, illustrating a state in which the drawer tray is not attached. FIG. 16B is a schematic diagram illustrating the schematic configuration of the main part of the dispensing unit, illustrating a state in which the drawer tray is attached. FIG. 16C is a schematic diagram illustrating the schematic configuration of the main part of the dispensing unit, illustrating a state in which the collection housing becomes full.

As illustrated in FIG. 16A, the collection housing 234D that forms the dispensing unit 234 of the second coin handling apparatus 23 of the reference embodiment is provided with a support portion 234D1 that supports the drawer tray 50. The support portion 234D1 is provided, for example, at each of front and rear ends of a bottom surface portion 234D2 of the collection housing 234D.

A sensor 250 is provided near the collection housing 234D. The sensor 250 comprises a light emitting unit 251 that emits detection light L, and a light receiving unit 252 that receives the detection light L. The light emitting unit 251 is provided rearward from a rear surface portion 234D3 of the collection housing 234D and emits the detection light L into the collection housing 234D through a through-hole of the rear surface portion 234D3. The light receiving unit 252 is provided frontward from a front surface portion 234D4 of the collection housing 234D and receives the detection light L incident through a through-hole of the front surface portion 234D4.

As illustrated in FIG. 16B, when the drawer tray 50 where the drawer 40 is placed is supported in the collection housing 234D, the detection light L progresses at a position at which progress of the detection light L is hindered by the drawer 40 and the detection light L does not reach the light receiving unit 252. Further, as illustrated in FIG. 16C, when the collection housing 234D which is collecting the coins C becomes full, the detection light L progresses at a position at which the progress of the detection light L is hindered by the coins C and the detection light L does not reach the light receiving unit 252. Note that, the "full" means a state in which the collection housing 234D becomes full with the coins C, and in which the collection housing 234D does not have any physical space to store another coin C. As described above, the sensor 250 is configured to be capable of detecting a normal state in which the drawer tray 50 is supported in the collection housing 234D, and an abnormal state in which the collection housing 234D becomes full.

When the drawer 40 is replenished with the coin C by using the second coin handling apparatus 23 of the reference embodiment having the above configuration, an operator sets the drawer tray 50 in the collection housing 234D as illustrated in FIG. 16B and puts the drawer portion 234A into the second coin handling apparatus 23. When the drawer portion 234A is put into the second coin handling apparatus 23, the sensor 250 emits the detection light L from the light emitting unit 251. The detection light L that has been emitted is blocked by the drawer 40 and does not reach the light receiving unit 252. In this case, the control unit 248 determines that the drawer 40 is set in the collection housing 234D, causes the coin C in the storage boxes 238A to 238H to be fed out, and causes the drawer 40 to be replenished with the coin C.

When the coin C in the storage boxes 238A to 238H is collected by using the second coin handling apparatus 23 of the reference embodiment, on the other hand, an operator puts the collection housing 234D into the second coin handling apparatus 23 in a state in which the drawer tray 50 is not set in the collection housing 234D as illustrated in FIG. 16A. In this case, since the detection light L emitted from the light emitting unit 251 reaches the light receiving unit 252, the control unit 248 determines that the collection housing 234D is not full. Thereafter, the control unit 248 causes the coin C in the storage boxes 238A to 238H to be fed out and causes the coin C to be stored in the collection housing 234D. Thereafter, when an amount of the coins C collected in the collection housing 234D increases and, as illustrated in FIG. 16C, the detection light L is blocked by the coins C and does not reach the light receiving unit 252, the control unit 248 determines that the collection housing 234D becomes full, and terminates the feeding out of the coin C. Then, the collection housing 234D is put out from the second coin handling apparatus 23, and then the coins C in the collection housing 234D are collected by the operator.

In the second coin handling apparatus 23 of the reference embodiment as described above, one sensor 250 has a function of detecting whether the drawer 40 is set in the collection housing 234D, and a function of detecting whether the collection housing 234D is in a full state. Accordingly, it is possible to reduce the number of parts, simplify the configuration, and reduce the cost in comparison with a case of providing two sensors that have the aforementioned two functions, respectively.

The disclosure of Japanese Patent Application No. 2020-171860, filed on Oct. 12, 2020, including the specification, drawings and abstract, is incorporated herein by reference in its entirety.

The present disclosure is applicable to a drawer tray, a coin handling apparatus, and a coin handling system.

The invention claimed is:

1. A coin handling apparatus, comprising:

a plurality of storage units; and a drawer tray for attachment of a drawer, the drawer tray comprising:

a placement table where the drawer is placed; and a regulation member to regulate a placement position where the drawer is placed on or above the placement table, the regulation member including at least one of:

a horizontal position regulating member to regulate the placement position of the drawer in a horizontal direction, and a height position regulating member to regulate the placement position of the drawer in a height direction, wherein the placement position of the drawer is adjusted by a disposition of the regulation member, the regulation member regulates a placement position of a first drawer to be a first position at which coins from the plurality of storage units are guided to a plurality of compartments provided in the placed first drawer, and the regulation member regulates a placement position of a second drawer to be a second position at which coins from the plurality of storage units are guided to a plurality of compartments provided in the placed second drawer, a type of the second drawer being different than a type of the first drawer, and the second position being different from the first position.

2. The coin handling apparatus according to claim 1, wherein the horizontal position regulating member slides in the horizontal direction with respect to the placement table.

3. The coin handling apparatus according to claim 1, wherein the height position regulating member slides in the height direction with respect to the placement table.

4. The coin handling apparatus according to claim 1, wherein the regulation member closes a hole portion provided in a side surface of the drawer.

5. The coin handling apparatus according to claim 1, wherein the regulation member comprises a placement assisting member which is configured to be separable from the regulation member, and which adjusts the placement position of the drawer by being separated from the regulation member and being attached to the placement table.

6. The coin handling apparatus according to claim 5, wherein the placement assisting member prevents the drawer from being placed on or above the placement table in an orientation different from a predetermined orientation.

7. The coin handling apparatus according to claim 5, wherein the horizontal position regulating member comprises:

a bottom surface abutting portion on which a bottom surface of the drawer abuts when the drawer is placed on or above the drawer tray; and a side surface abutting portion which abuts on a side surface portion of the drawer when the drawer is placed on or above the drawer tray, and the placement assisting member has a height identical to a height of the bottom surface abutting portion.

8. The coin handling apparatus according to claim 1, wherein the first drawer and the second drawer from each other in at least one of size, shape and/or height of the drawer, and/or size, shape and/or location of a compartment of the drawer.

9. The coin handling apparatus according to claim 1, wherein the placement table is provided with a mark that allows the regulation member to be aligned to the position in accordance with the type of the drawer.

10. The coin handling apparatus according to claim 1, wherein the drawer tray is attached to a coin handling apparatus, the placement table comprises a first surface, and a second surface located on a side opposite to the first surface, the first surface is provided with the regulation member in accordance with a drawer of a first type, and the second surface is provided with the regulation member in accordance with a drawer of a second type.

11. The coin handling apparatus according to claim 1, wherein the horizontal position regulating member comprises:

a bottom surface abutting portion on which a bottom surface of the drawer abuts when the drawer is placed on or above the drawer tray, and a side surface abutting portion which abuts on a side surface portion of the drawer when the drawer is placed on or above the drawer tray.

12. The coin handling apparatus according to claim 11, wherein the bottom surface abutting portion has a substantially square plate shape.

13. The coin handling apparatus according to claim 11, wherein the side surface abutting portion comprises a pair of erected portions and a bridge portion, the pair of erected portions extend in a direction orthogonal to a plate-shaped main surface of the bottom surface abutting portion, and the bridge portion connects upper ends of the pair of erected portions.

* * * * *